(12) United States Patent
Yonekawa et al.

(10) Patent No.: US 12,395,029 B2
(45) Date of Patent: Aug. 19, 2025

(54) INSULATOR, STATOR AND ELECTRIC MOTOR

(71) Applicant: MITSUBA Corporation, Gunma (JP)

(72) Inventors: Koji Yonekawa, Gunma (JP); Takeshi Kanai, Gunma (JP); Ryo Ohori, Gunma (JP); Yukari Otsuka, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/009,738

(22) PCT Filed: Mar. 17, 2022

(86) PCT No.: PCT/JP2022/012158
§ 371 (c)(1),
(2) Date: Dec. 12, 2022

(87) PCT Pub. No.: WO2022/264580
PCT Pub. Date: Dec. 22, 2022

(65) Prior Publication Data
US 2024/0136880 A1    Apr. 25, 2024
US 2024/0235309 A9    Jul. 11, 2024

(30) Foreign Application Priority Data
Jun. 15, 2021 (JP) ................. 2021-099567

(51) Int. Cl.
*H02K 3/34*    (2006.01)
*H02K 1/16*    (2006.01)
*H02K 1/18*    (2006.01)

(52) U.S. Cl.
CPC ............. *H02K 3/345* (2013.01); *H02K 1/16* (2013.01); *H02K 1/18* (2013.01)

(58) Field of Classification Search
CPC .. H02K 1/16; H02K 1/18; H02K 3/00; H02K 3/18; H02K 3/34; H02K 3/345; H02K 3/52; H02K 3/522
See application file for complete search history.

(56) References Cited

U.S. PATENT DOCUMENTS

| | | | |
|---|---|---|---|
| 9,438,079 B2* | 9/2016 | Nace | H01R 39/385 |
| 2003/0011271 A1* | 1/2003 | Takano | H02K 15/095 |
| | | | 310/254.1 |
| 2010/0096945 A1* | 4/2010 | Tsukamoto | H02K 3/522 |
| | | | 310/215 |

FOREIGN PATENT DOCUMENTS

| | | |
|---|---|---|
| JP | 2000032694 | 1/2000 |
| JP | 2002247789 | 8/2002 |

(Continued)

OTHER PUBLICATIONS

"International Search Report (Form PCT/ISA/210) of PCT/JP2022/012158," mailed on May 17, 2022, pp. 1-4.

(Continued)

*Primary Examiner* — Tran N Nguyen
(74) *Attorney, Agent, or Firm* — JCIPRNET

(57) ABSTRACT

An insulator attached to a core body in an annular shape and multiple teeth protruding from the core body along a radial direction for insulating the teeth and a coil wound around the teeth includes: a tooth end surface covering part covering an axial end surface of the tooth. The tooth end surface covering part includes: an inclined part provided on a front surface of the tooth end surface covering part on a side opposite to the tooth and inclined such that its height from the axial end surface of the tooth gradually changes along the radial direction; and an inclined part parallel part and a tooth parallel part provided on a back surface of the tooth (Continued)

end surface covering part on the tooth side and concave in a direction away from the axial end surface of the tooth.

10 Claims, 19 Drawing Sheets

(56) References Cited

FOREIGN PATENT DOCUMENTS

| | | |
|---|---|---|
| JP | 2003324913 | 11/2003 |
| JP | 2011035989 | 2/2011 |
| JP | 2013017280 | 1/2013 |
| JP | 2014230305 | 12/2014 |
| JP | 2016067100 | 4/2016 |
| JP | 2017118671 | 6/2017 |

OTHER PUBLICATIONS

"International Preliminary Report on Patentability of PCT/JP2022/012158; this report contains the following items: Form PCT/IB/326, PCT/IB/338, PCT/IB/373, PCT/ISA237(cover sheet), PCT/ISA237(Box No. I), PCT/ISA237(Box No. V)", mailed on Dec. 28, 2023, Dec. 14, 2023 and May 17, 2022, which is English translation of "Written Opinion of the International Searching Authority", p. 1-p. 15.

* cited by examiner

INSULATOR, STATOR AND ELECTRIC MOTOR

CROSS-REFERENCE TO RELATED APPLICATION

This application is a 371 application of the International PCT application serial no. PCT/JP2022/012158, filed on Mar. 17, 2022, which claims the priority benefits of Japan Patent Application No. 2021-099567, filed on Jun. 15, 2021. The entirety of each of the above-mentioned patent applications is hereby incorporated by reference herein and made a part of this specification.

TECHNICAL FIELD

The disclosure relates to an insulator, a stator and an electric motor.

RELATED ART

An electric motor includes, for example, a stator wound with a coil, and a rotor provided rotatably with respect to the stator and having a permanent magnet. The stator is made of a magnetic material, and includes an annular core body (circular core part) and teeth (magnetic pole teeth) radially protruding from the core body. A coil is wound around the teeth on the insulator. The insulator is made of an insulating resin. The insulator provides insulation between the teeth and the coil.

Under such a configuration, when the coil is energized, a magnetic field is formed in the teeth. Magnetic attractive force and repulsive force are generated between this magnetic field and the permanent magnet, and the rotor is continuously rotated.

Here, the torque performance of the electric motor greatly affects the space factor of the coil for generating the magnetic field. Therefore, various techniques have been proposed to improve the space factor of the coil. For example, a technique is disclosed in which the insulator is inclined such that the height from the surface of the tooth varies in a constant direction between the tip and base of the tooth. With this configuration, when the coil is wound on the insulator, the coil is wound in a constant direction. Therefore, the coil may be wound with as little space as possible, and the space factor of the coil may be improved as much as possible.

CITATION LIST

Patent Literature

[Patent Literature 1] Japanese Patent Application Laid-Open No. 2002-247789

SUMMARY

Technical Problem

However, in the conventional technology described above, since the insulator is inclined so that the height from the surface of the tooth varies in a constant direction between the tip and base of the tooth, the thickness of the teeth also changes without being constant. For this reason, there is a problem that heat sink marks or the like may occur when the insulator is molded with resin, and the moldability of the insulator is deteriorated.

Accordingly, the disclosure provides an insulator capable of improving moldability, and a stator and an electric motor using this insulator.

Solution to Problem

In view of the above, an insulator according to the disclosure is an insulator attached to a core body in an annular shape and multiple teeth protruding from the core body along a radial direction for insulating the teeth and a coil wound around the teeth, and the insulator includes: a tooth end surface covering part covering an axial end surface of the tooth. The tooth end surface covering part includes: an inclined part provided on a surface of the tooth end surface covering part on a side opposite to the tooth and inclined such that its height from the axial end surface of the tooth gradually changes along the radial direction; and a concave part provided on a surface of the tooth end surface covering part on the tooth side and concave in a direction away from the axial end surface of the tooth.

Effects of Invention

According to the disclosure, it is possible to prevent an increase in the thickness of the inclined part of the insulator. Therefore, deterioration of moldability due to heat sink marks or the like may be suppressed when the insulator is resin-molded.

DESCRIPTION OF THE EMBODIMENTS

Next, an embodiment of the disclosure will be described with reference to the drawings.

<Motor with Speed Reducer>

Figure 1:
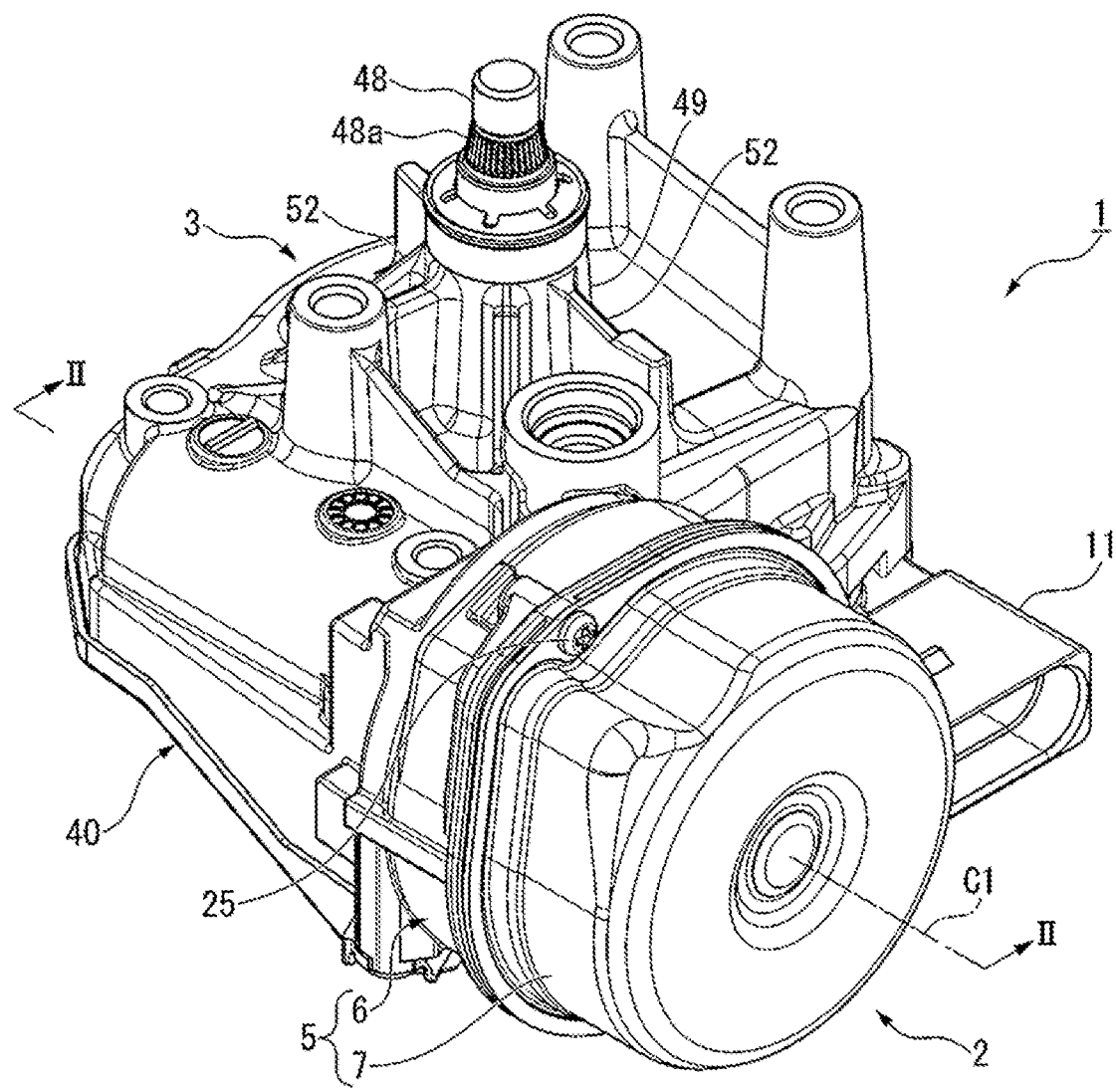
FIG. 1 is a perspective view of a motor with a speed reducer according to an embodiment of the disclosure.
Figure 2:
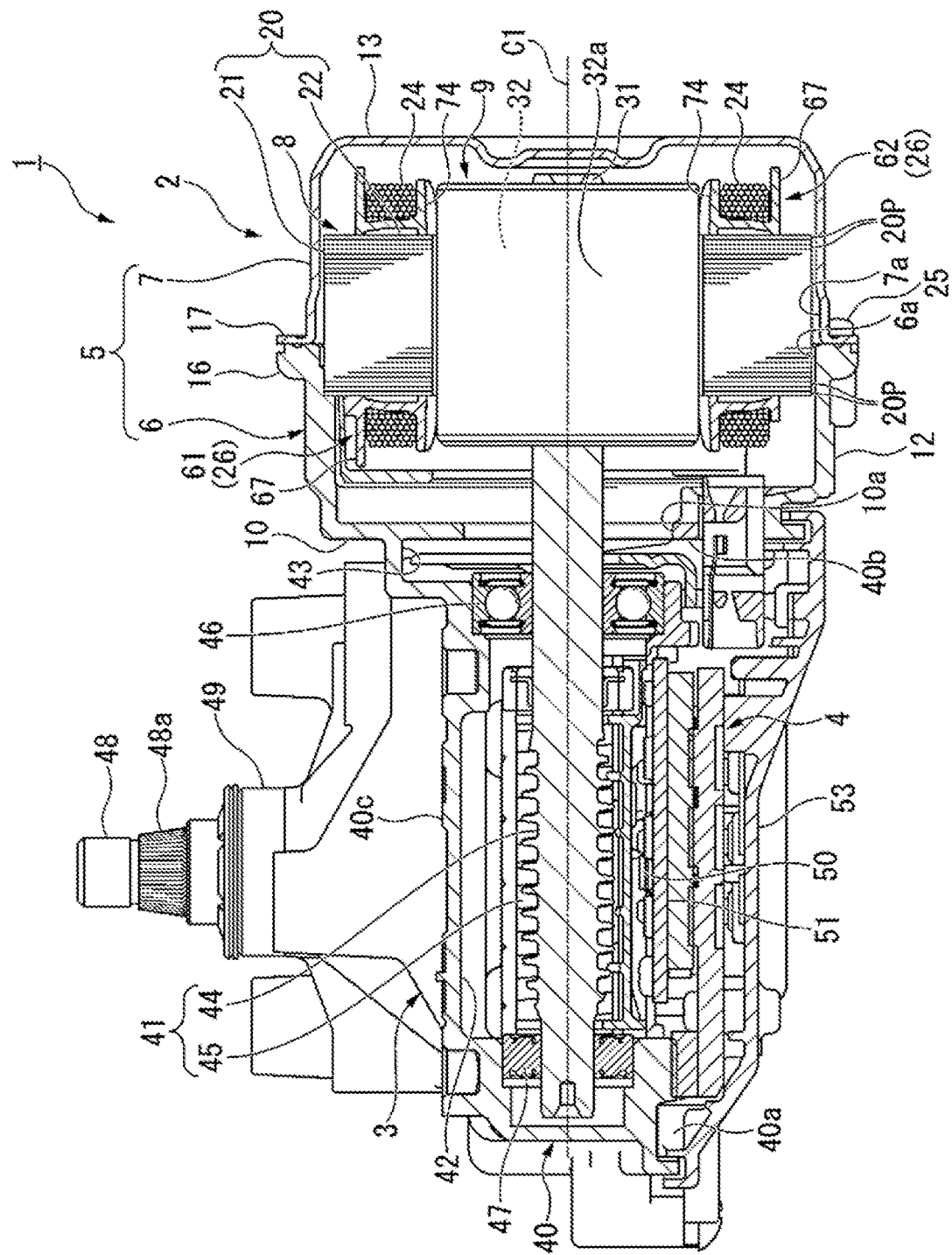
FIG. 2 is a cross-sectional view taken along the line II-II of FIG. 1.

FIG. 1 is a perspective view of a motor 1 with a speed reducer. FIG. 2 is a cross-sectional view taken along the line II-II of FIG. 1.

The motor 1 with a speed reducer is used, for example, as a drive source for a wiper device of a vehicle.

As shown in FIGS. 1 and 2, the motor 1 with a speed reducer includes an electric motor 2, a speed reduction part 3 that decelerates and outputs the rotation of the electric motor 2, and a controller 4 that controls the drive of the electric motor 2.

In the following description, in the case of simply saying the "axial direction," it means a direction parallel to the central axis of a shaft 31 of the electric motor 2 (rotation axis C1 of the electric motor 2). In the case of simply saying the "circumferential direction," it means the circumferential direction (rotation direction) of the shaft 31. In the case of simply saying the "radial direction," it means the radial direction of the shaft 31 perpendicular to the axial direction and the circumferential direction.

<Electric Motor>

The electric motor 2 includes a motor case 5, a cylindrical stator 8 housed in the motor case 5, and a rotor 9 provided inside the stator 8 in the radial direction and provided rotatably with respect to the stator 8. The electric motor 2 is a so-called brushless motor that does not require a brush to supply electric power to the stator 8.

<Motor Case>

The motor case 5 is made of a material having good heat dissipation property such as an aluminum alloy. The motor case 5 includes a first motor case 6 and a second motor case 7 which are configured to be separable in the axial direction. The outer shapes of the first motor case 6 and the second motor case 7 are each formed into a bottomed cylindrical shape.

A bottom part 10 of the first motor case 6 is formed integrally with a gear case 40 of the speed reduction part 3. A through hole 10a through which the shaft 31 of the electric motor 2 may be inserted is formed at the center of the bottom part 10 in the radial direction. Outer flange parts 16 and 17 protruding radially outward are formed in openings 6a and 7a of the first motor case 6 and the second motor case 7, respectively. The outer flange parts 16 and 17 are butted against each other, and the first motor case 6 and the second motor case 7 are integrated with bolts 25. The motor case 5 has an internal space closed by the first motor case 6 and the second motor case 7, and a stator 8 and a rotor 9 are housed in this internal space.

<Rotor>

The rotor 9 is rotatably provided inside the stator 8 in the radial direction via a minute gap. The rotor 9 includes the shaft 31, a cylindrical rotor core 32 fitted and fixed to the shaft 31, multiple magnets (not shown) attached to the outer periphery of the rotor core 32, and a magnet cover 32a covering the rotor core 32 from above the magnets.

The shaft 31 is integrally molded with a worm shaft 44 that configures the speed reduction part 3. However, the disclosure is not limited thereto, and the worm shaft 44 may be formed separately from the shaft 31 and connected to the end of the shaft 31. The shaft 31 and the worm shaft 44 are rotatably supported by the gear case 40 via bearings 46 and 47. The shaft 31 and the worm shaft 44 rotate around the rotation axis C1. A ferrite magnet, for example, is used as the magnet. However, the disclosure is not limited thereto, and a neodymium bond magnet, a neodymium sintered magnet, or the like may be applied as the magnet.

<Speed Reduction Part>

The speed reduction part 3 includes a gear case 40 integrated with the motor case 5 and a worm reduction mechanism 41 housed in the gear case 40. The gear case 40 is made of a metal material having good heat dissipation property such as an aluminum alloy. The gear case 40 is formed in a box shape having an opening 40a on one side. The gear case 40 includes a gear housing part 42 for housing the worm reduction mechanism 41 inside. Further, in a side wall 40b of the gear case 40, an opening 43 is formed at a part where the first motor case 6 is integrally formed to communicate the through hole 10a of the first motor case 6 and the gear housing part 42.

A cylindrical bearing boss 49 protrudes from a bottom wall 40c of the gear case 40. The bearing boss 49 is for rotatably supporting an output shaft 48 of the worm reduction mechanism 41, and a slide bearing (not shown) is disposed on the inner peripheral side. An O-ring (not shown) is attached to the inner peripheral surface of the tip of the bearing boss 49. Multiple ribs 52 are provided protruding from the outer peripheral surface of the bearing boss 49 to ensure rigidity.

The worm reduction mechanism 41 housed in the gear housing part 42 is configured by a worm shaft 44 formed integrally with the shaft 31 of the rotor 9 and a worm wheel 45 meshing with the worm shaft 44. The worm shaft 44 is rotatably supported by the gear case 40 via bearings 46 and 47 at both ends in the axial direction about the rotation axis C1. The output shaft 48 of the electric motor 2 is provided coaxially and integrally with the worm wheel 45. The worm wheel 45 and the output shaft 48 are disposed such that their rotation axes are perpendicular to the rotation axis C1 of the worm shaft 44 (the shaft 31 of the electric motor 2). The output shaft 48 protrudes outside through the bearing boss 49 of the gear case 40. A protruding tip of the output shaft 48 is formed with a spline 48a that may be connected to an object to be driven by the motor.

The worm wheel 45 is also provided with a sensor magnet (not shown). The position of this sensor magnet is detected by a magnetic detection element 50 (to be described later) provided in the controller 4. That is, the rotational position of the worm wheel 45 is detected by the magnetic detection element 50 of the controller 4.

<Controller>

The controller 4 includes a controller board 51 on which the magnetic detection element 50 is mounted. The controller board 51 is disposed in the opening 40a of the gear case 40 so that the magnetic detection element 50 faces the sensor magnet of the worm wheel 45. The opening 40a of the gear case 40 is closed with a cover 53.

The controller board 51 is electrically connected to coils 24 of the stator 8, which will be described later. Further, terminals of the connector 11 (see FIG. 1) provided on the cover 53 are electrically connected to the controller board 51. In addition to the magnetic detection element 50, a power module (not shown) including a switching element such as a field effect transistor (FET) for controlling the drive voltage supplied to the coils 24, a capacitor (not shown) for smoothing the voltage and the like are mounted on the controller board 51.

<Stator and Terminal Holder>

Figure 3:
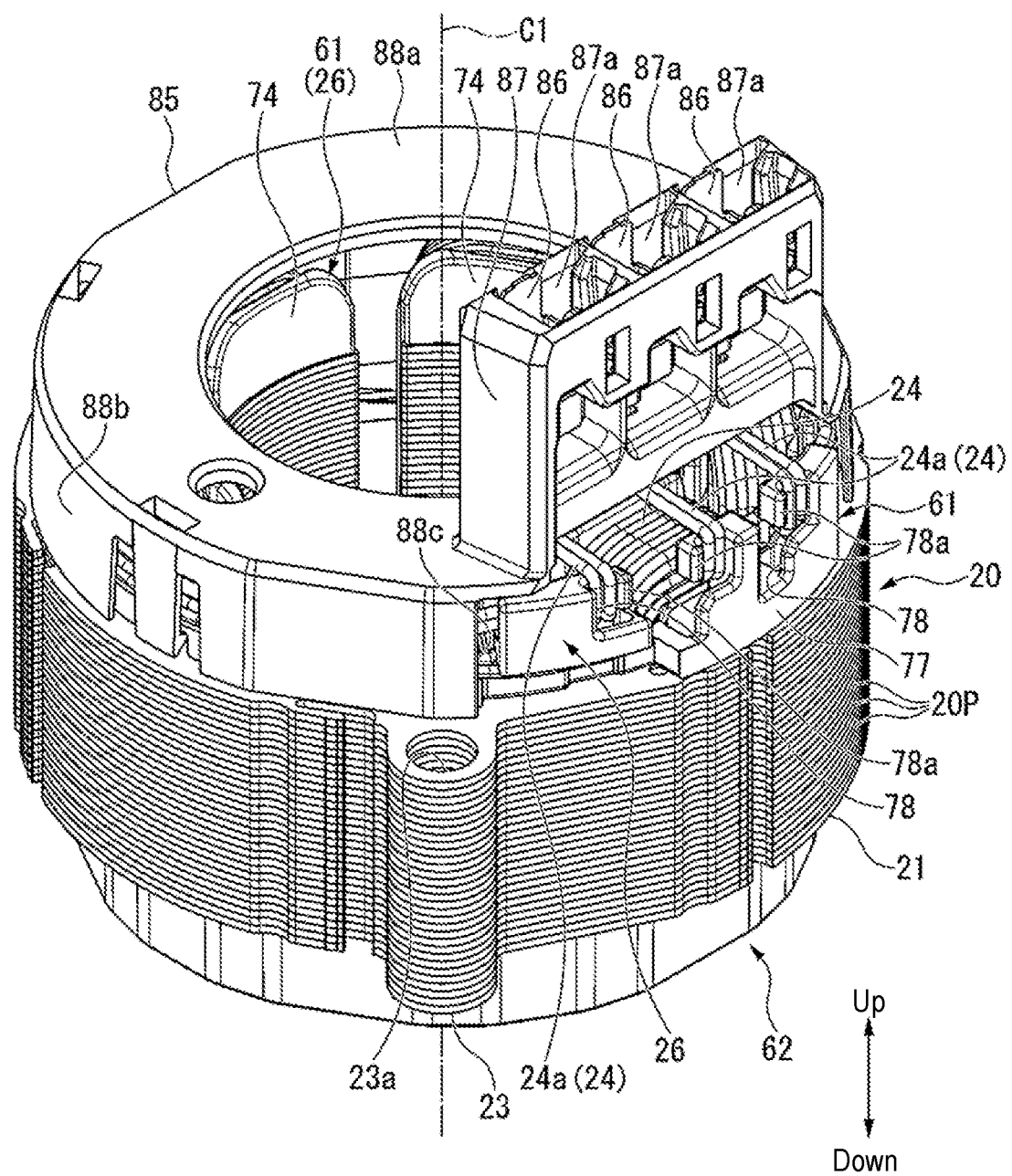
FIG. 3 is a perspective view of a stator according to an embodiment of the disclosure.
Figure 4:
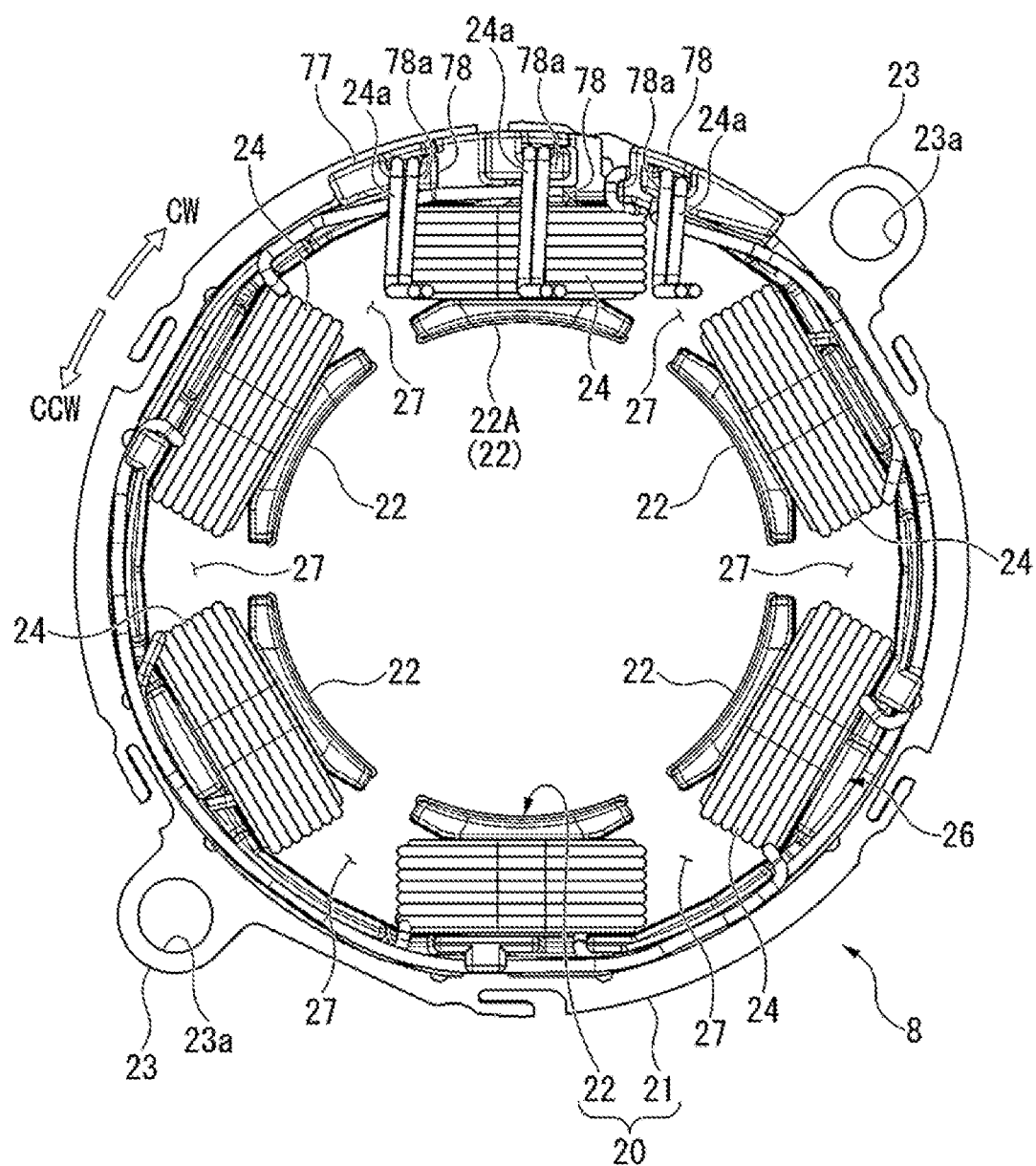
FIG. 4 is a plan view of the stator according to an embodiment of the disclosure as viewed from the axial direction, showing a state in which a terminal holder is removed.

FIG. 3 is a perspective view of the stator 8. FIG. 4 is a plan view of the stator 8 as viewed from the axial direction, showing a state in which a terminal holder 85 is removed. Moreover, FIG. 4 shows a part of the insulator 26 cut away.

As shown in FIGS. 3 and 4, the stator 8 includes a cylindrical stator core 20 whose center axis coincides with the rotation axis C1, an insulator 26 attached to the stator core 20, and multiple coils 24 having a three-phase (U-phase, V-phase, W-phase) structure wound around the stator core 20 from above the insulator 26.

A terminal holder 85 is provided on the stator core 20. The terminal holder 85 includes terminals 86, a holder body 87 that holds the terminals 86, and a cover part 88 that covers one end of the stator core 20 in the axial direction, which are integrally formed. The terminals 86 are connected to terminal parts 24a of the coils 24 of each phase, and to connectors (not shown) extending from the controller board 51.

The cover part 88 includes an annular end surface cover part 88a disposed to face the stator core 20 in the axial direction, and an outer periphery cover part 88b extending from the outer peripheral edge of the end surface cover part 88a toward the stator core 20 side and covering the insulator 26 from the outside in the radial direction, which are integrally formed.

The holder body 87 is formed to rise from a part of the end surface cover part 88a toward the side opposite to the stator core 20. A cut-out part 88c is formed in a part corresponding to the holder body 87 of the end surface cover part 88a and the outer periphery cover part 88b.

The holder body 87 is formed in a rectangular parallelepiped shape extending in the axial direction and the circumferential direction. A connector (not shown) extending from the controller board 51 is attached to the holder body 87. The holder body 87 is formed with three terminal housing recesses 87a disposed in the longitudinal direction when viewed from the axial direction. The terminals 86 are housed and held in these terminal housing recesses 87a.

Then, the terminals 86 and connectors (not shown) extending from the controller board 51 are connected.

The stator core 20 is formed by stacking multiple electromagnetic steel sheets 20p. However, the disclosure is not limited thereto, and the stator core 20 may be formed by, for example, pressure-molding soft magnetic powder.

The stator core 20 includes a cylindrical core body 21, multiple (six in this first embodiment) teeth 22 protruding radially inward from the inner peripheral surface of the core body 21, and two fixing parts 23 integrally formed on the outer peripheral surface of the core body 21. The tooth 22 includes a tooth body 28 protruding radially from the inner peripheral surface of the core body 21 and a collar part 29 integrally formed with a tooth tip part 28a, which is radially inner end of the tooth body 28 opposite to the core body 21. The coil 24 is wound around the tooth body 28 from above the insulator 26.

The collar part 29 extends along the circumferential direction. The inner peripheral surface of the collar part 29 is formed along a circle centered on the rotation axis C1. Between the teeth 22 adjacent in the circumferential direction, dovetail groove-shaped slots 27 are formed by the inner peripheral surface of the core body 21, the circumferential side surface of the tooth body 28, and the outer peripheral surface of the collar part 29 when viewed in the axial direction.

The fixing part 23 protrudes radially outward from the outer peripheral surface of the core body 21 and are disposed at intervals of 180° in the circumferential direction. A bolt insertion hole 23a is formed in the fixing part 23 so as to extend therethrough in the axial direction.

With such a configuration, the outer peripheral surface of the core body 21 is fitted to the inner peripheral surface of the first motor case 6 and housed therein. The stator core 20 is fastened and fixed to the first motor case 6 by inserting a tapping screw (not shown) into the bolt insertion hole 23a of the fixing part 23 and screwing the tapping screw into the bottom part 10 of the first motor case 6. The stator core 20 fixed in this way is covered with the second motor case 7. Then, the second motor case 7 is fixed to the first motor case 6.

First Embodiment

<Insulator>

Figure 5:
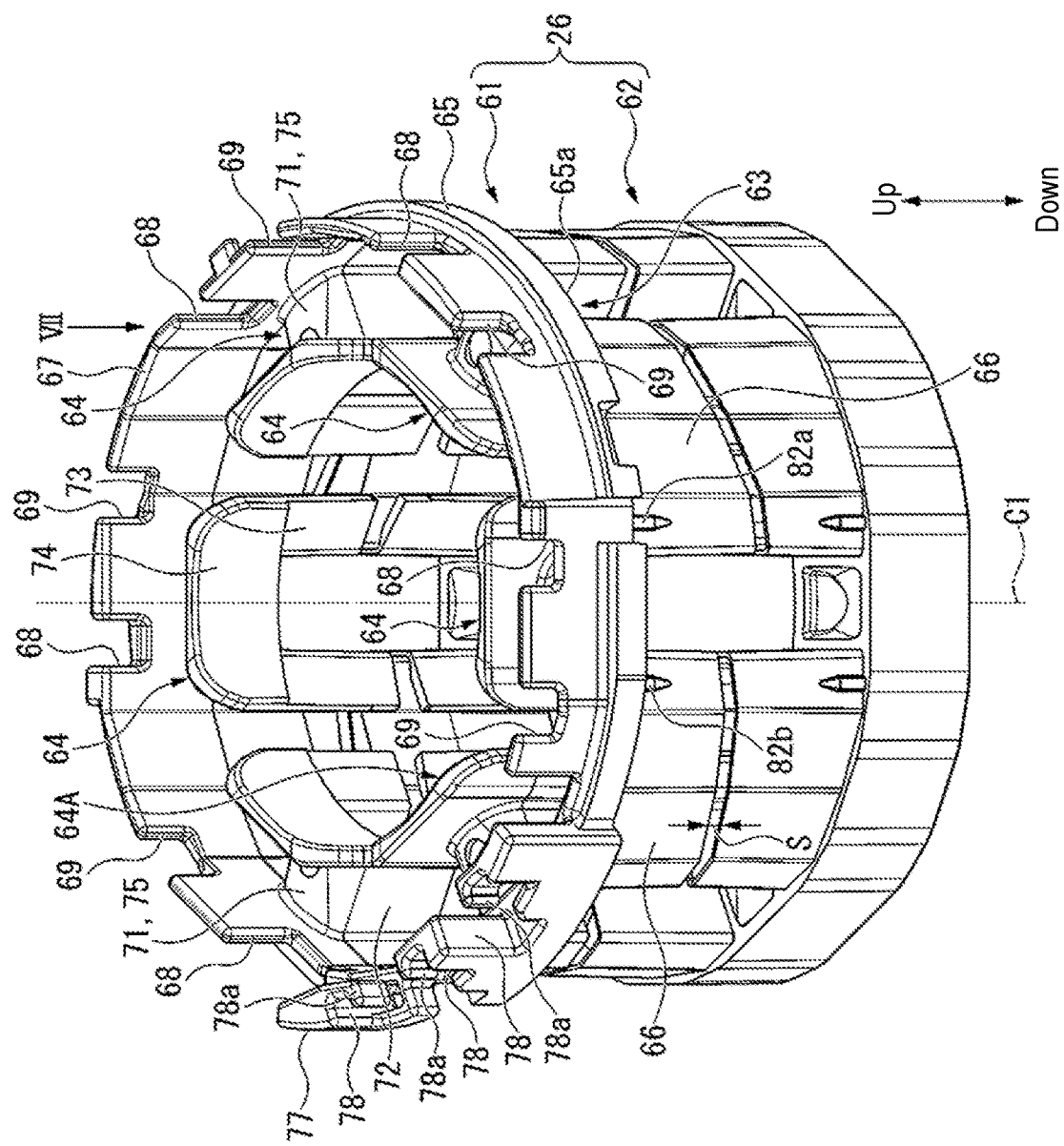
FIG. 5 is a perspective view of an insulator according to an embodiment of the disclosure.
Figure 6:
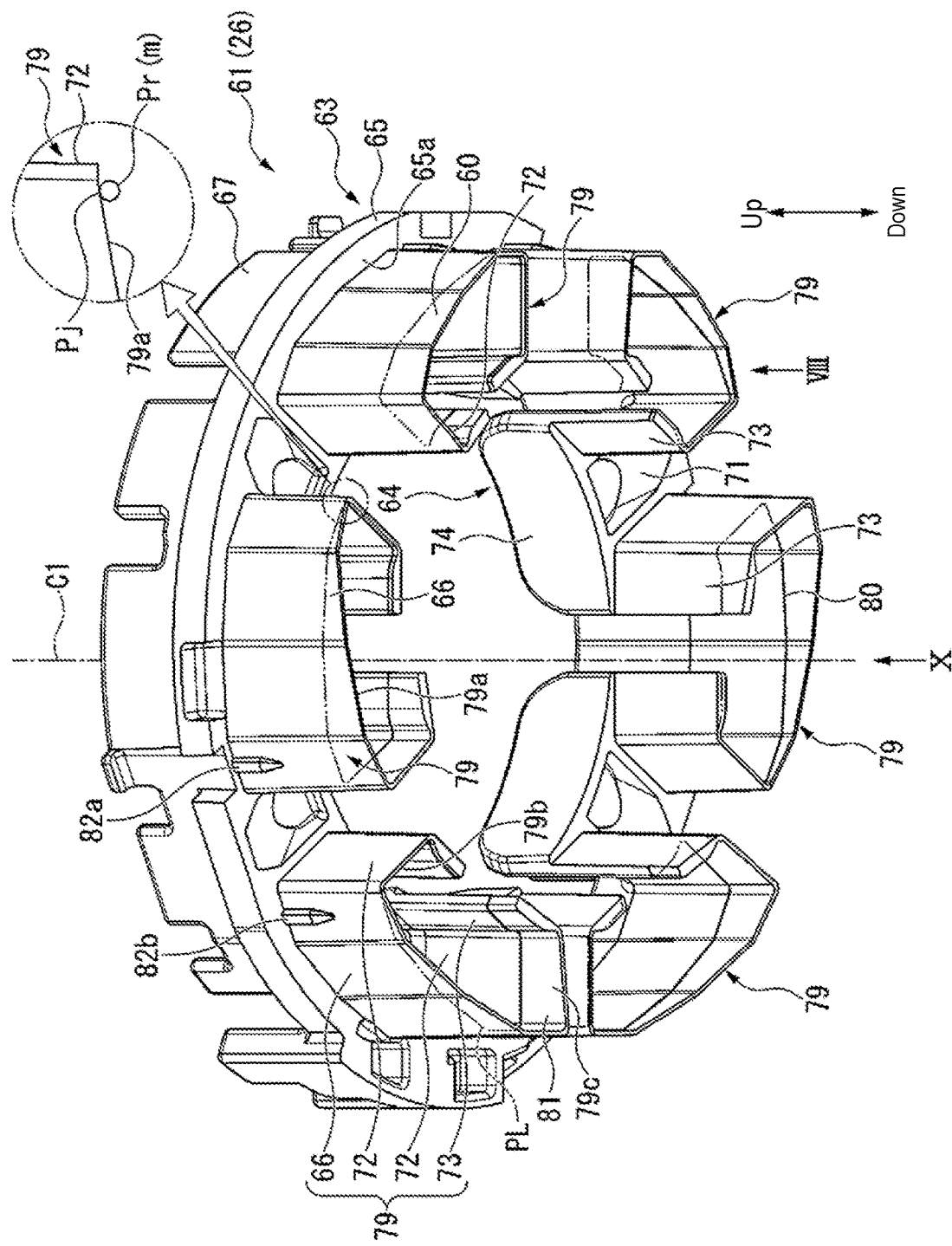
FIG. 6 is a perspective view of a first insulator according to an embodiment of the disclosure.

FIG. 5 is a perspective view of the insulator 26. FIG. 5 shows the insulator 26 attached to the stator core 20. FIG. 6 is a perspective view of a first insulator 61 in the insulator 26.

The insulator 26 serves to provide insulation between the teeth 22 and the coils 24, and is made of insulating resin.

As shown in FIGS. 5 and 6, the insulator 26 is axially divided into two parts so as to be attached from both sides of the stator core 20 in the axial direction. That is, the insulator 26 includes a first insulator 61 attached from one axial side (upper side in FIG. 5) of the stator core 20 and a second insulator 62 attached from the other axial side (lower side in FIG. 5) of the stator core 20.

In the following description, the side of the first insulator 61 will be referred to as the upper side, and the side of the second insulator 62 will be referred to as the lower side in order to facilitate understanding of the description.

The first insulator 61 includes a core body covering part 63 that covers the core body 21 and a tooth covering part 64 that covers the tooth 22, which are integrally formed. The core body covering part 63 includes an annular core end surface covering part 65 covering the axial end surface of the core body 21, a core side surface covering part 66 protruding downward from a lower surface 65a of the core end surface covering part 65, and a cylindrical outer wall part 67 protruding upward from an upper surface 65b of the core end surface covering part 65.

The core side surface covering part 66 is disposed on the inner peripheral edge of the core end surface covering part 65. The core side surface covering part 66 covers the inner peripheral surface of the core body 21. The outer wall part 67 is disposed near the outer peripheral edge of the core end surface covering part 65. An outer periphery cover part 88b of the terminal holder 85 is disposed radially outside the outer wall part 67.

A pull-in slit 68 and a pull-out slit 69 are formed in the outer wall part 67 at positions corresponding to the respective tooth covering parts 64.

The pull-in slit 68 is for pulling in the coil 24 from the radially outer side to the radially inner side of the outer wall part 67. The pull-out slit 69 is for pulling out the coil 24 from the radially inner side to the radially outer side of the outer wall part 67. The details of the pulling in or pulling out of the coil 24 through the slits 68, 69 and the detailed positions of the slits 68, 69 will be described later.

The core end surface covering part 65 and the outer wall part 67 are integrally formed with a coil pull-out part 77 at the base of the tooth covering part 64A (hereinafter, this tooth covering part 64A is referred to as a specific tooth covering part 64A) that covers a specific tooth 22A (with reference to FIG. 4, hereinafter, this tooth 22A is referred to as the specific tooth 22A) among the multiple teeth 22.

The coil pull-out part 77 is a part for pulling upward the terminal part 24a (see FIG. 3) of the coil 24 of each phase. The terminal holder 85 is disposed such that the cut-out part 88c of the terminal holder 85 fits into the coil pull-out part 77. That is, the terminal 86 of the terminal holder 85 is disposed directly above the coil pull-out part 77.

The coil pull-out part 77 has multiple (three, for example, because the coils 24 of the first embodiment have a three-phase structure) coil guide recesses 78 for separately regulating the pull-out parts of the terminal parts 24a of the coils 24 of each phase. These coil guide recesses 78 are collectively disposed side by side in the circumferential direction. Each coil guide recess 78 is integrally formed with a coil holding claw 78a protruding in the circumferential direction. The terminal parts 24a of the coils 24 of each phase are individually pulled out upward through the respective coil guide recesses 78. The terminal parts 24a of the pulled-out coils 24 of each phase are guided to the terminals 86 of the terminal holder 85 while being held by the coil holding claws 78a, and are connected to the terminals 86.

Figure 7:
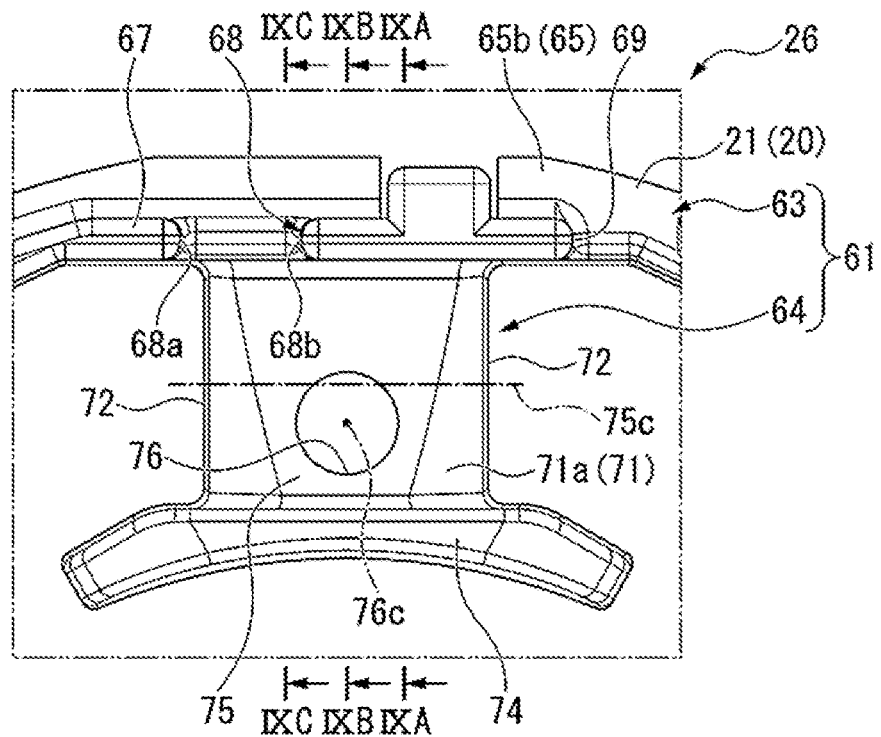
FIG. 7 is a view in the direction of the arrow VII of FIG. 5.
Figure 8:
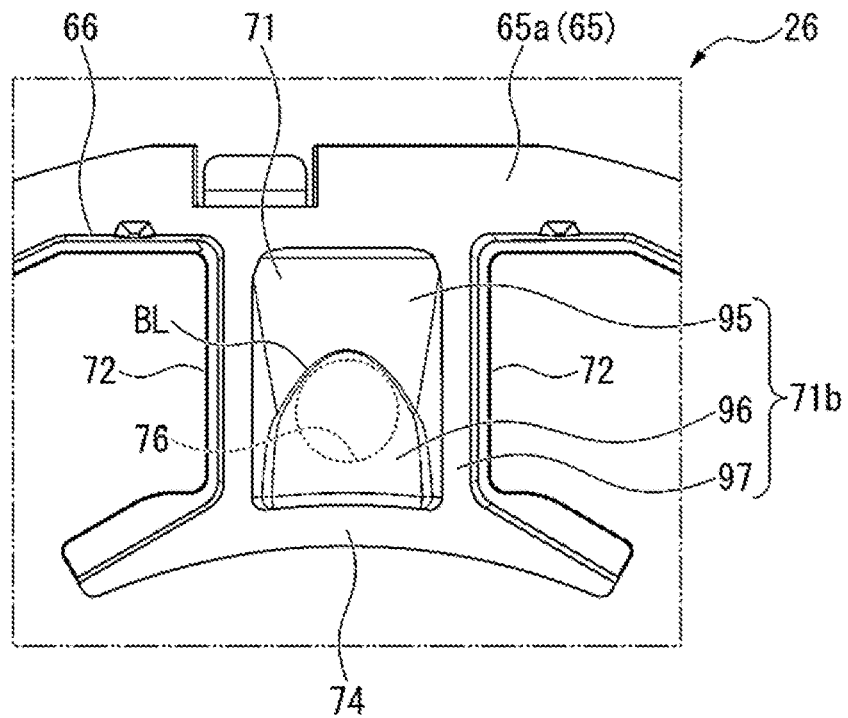
FIG. 8 is a view in the direction of the arrow VIII of FIG. 6.
Figure 9A:
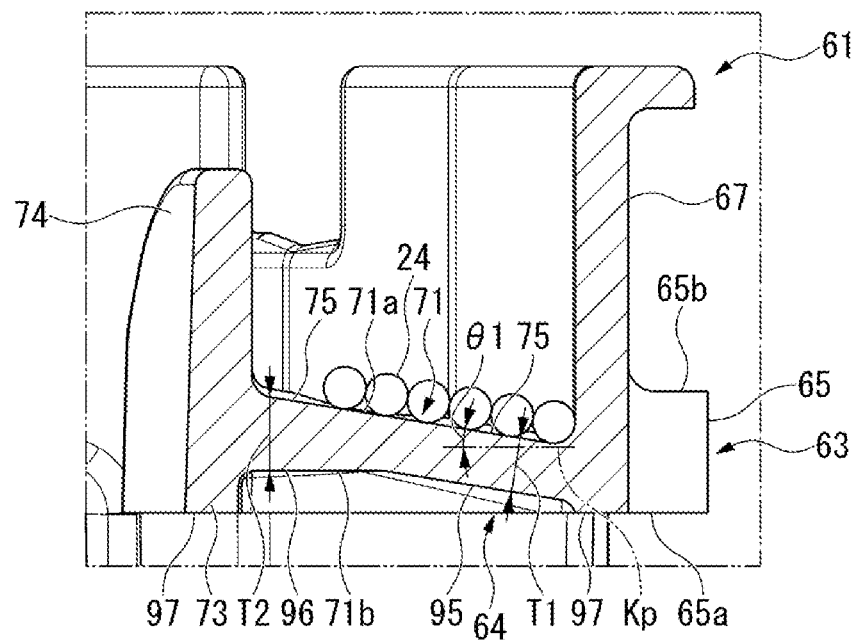
FIG. 9A is a cross-sectional view taken along the line IXA-IXA of FIG. 7.
Figure 9B:
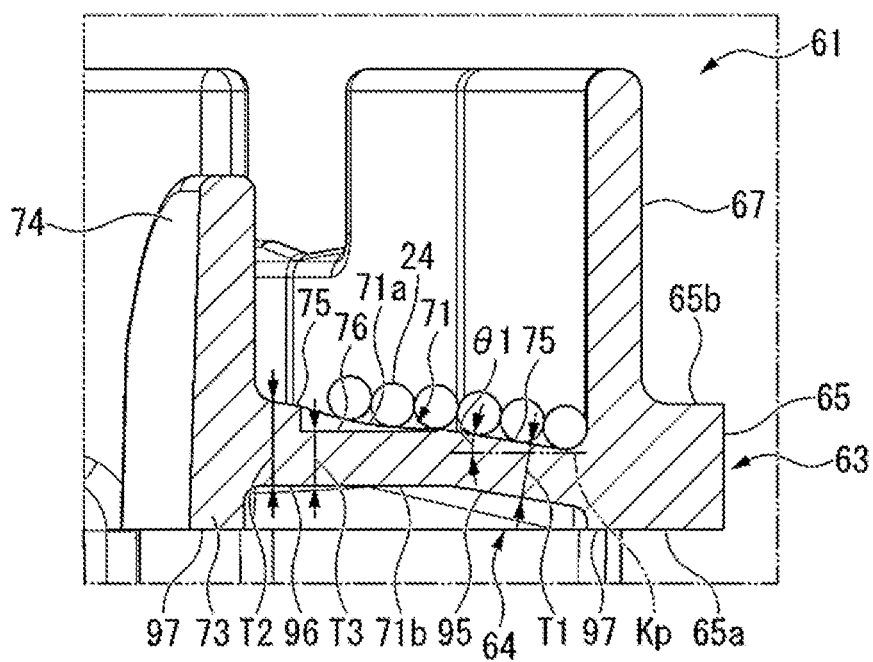
FIG. 9B is a cross-sectional view taken along the line IXB-IXB of FIG. 7.
Figure 9C:
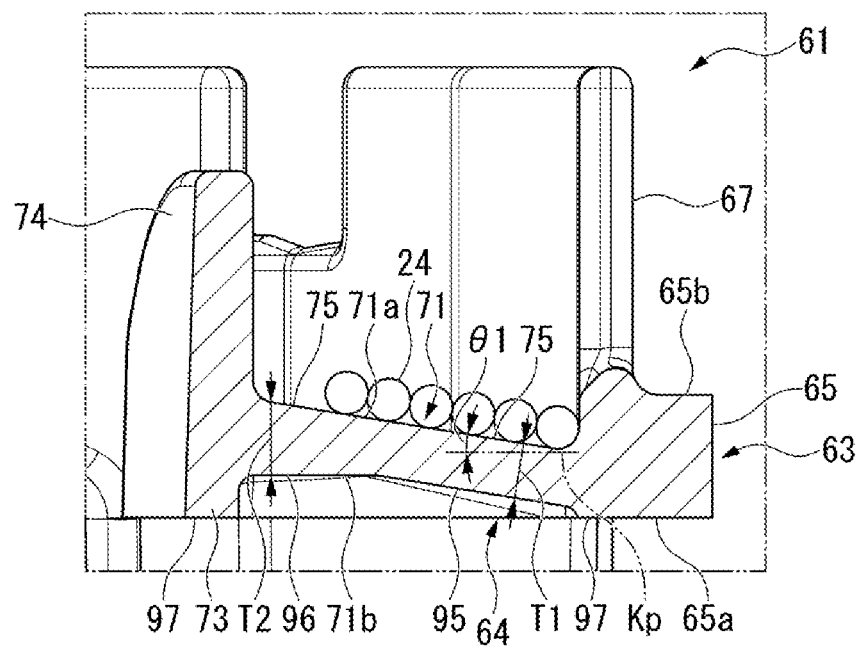
FIG. 9C is a cross-sectional view taken along the line IXC-IXC of FIG. 7.

FIG. 7 is a view in the direction of the arrow VII of FIG. 5. FIG. 8 is a view in the direction of the arrow VIII of FIG. 6. FIG. 9A is a cross-sectional view taken along the line IXA-IXA of FIG. 7. FIG. 9B is a cross-sectional view taken along the line IXB-IXB of FIG. 7. FIG. 9C is a cross-sectional view taken along the line IXC-IXC of FIG. 7.

As shown in FIGS. 5 to 9C, the tooth covering part 64 includes a tooth end surface covering part 71 extending from the core end surface covering part 65 along the plane direction of the core end surface covering part 65 and extending in the radial direction, a tooth side surface covering parts 72 protruding downward from both sides (two ends in the lateral direction) of the tooth end surface covering part 71 in the circumferential direction, a collar side surface covering part 73 protruding outward in the circumferential direction from the radially inner end of the tooth side surface covering part 72, and an inner wall part 74 joined to the radially inner end of the tooth end surface covering part 71 and the upper end of the collar side surface covering part 73 and extending upward from the upper end of the collar side surface covering part 73.

The tooth end surface covering part 71 covers the upper end of the tooth body 28. Here, the surface of the tooth end surface covering part 71 opposite to the upper end of the tooth body 28 is defined as a front surface 71a, and the surface facing the upper end of the tooth body 28 is defined as a back surface 71b. Most of the front surface 71a of the tooth end surface covering part 71 is formed with an inclined part 75 over the entire radial direction. The inclined part 75 is inclined such that the height from the axial end surface of the tooth body 28 gradually decreases radially outward. In this way, the circumferential width of the inclined part 75 gradually increases radially outward.

A pin contact recess (an example of a recess in the claims) 76 having a circular shape when viewed from the axial direction is formed radially inward on the front surface 71a of the tooth end surface covering part 71. The pin contact recess 76 is a part with which an ejector pin of a resin molding machine (not shown) is in contact during resin molding of the first insulator 61. The pin contact recess 76 is formed parallel to the axial end surface of the tooth body 28.

As for the detailed position of the pin contact recess 76, a center 76c of the pin contact recess 76 is located radially inside a radial center 75c of the inclined part 75. The pin contact recess 76 is formed so as to fit on the inclined part 75. Since the pin contact recess 76 is disposed radially inward, the diameter is smaller than when it is disposed radially outward.

The back surface 71b of the tooth end surface covering part 71 is formed with an inclined part parallel part 95 (concave part). The inclined part parallel part 95 is formed to correspond to the shape of the inclined part 75. Therefore, the thickness T1 of the tooth end surface covering part 71 is constant in the region where the inclined part parallel part 95 exists. The inclination angle θ1 of such an inclined part 75 is smaller than 45°. The inclination angle θ1 refers to the inclination angle with respect to the upper end (virtual plane Kp) of the tooth body 28.

Furthermore, the tooth parallel part 96 (concave part) is formed on the back surface 71b radially inward of the inclined part parallel part 95. The tooth parallel part 96 is formed parallel to the axial end surface of the tooth body 28. Therefore, the thickness T2 of the tooth end surface covering part 71 gradually increases radially outward in the region where the tooth parallel part 96 exists. That is, T1<T2. In this way, the wall thickness of the connecting part of the tooth end surface covering part 71 with the inner wall part 74 is increased, and the strength of the inner wall part 74 may be increased. Therefore, even if a radially inward stress is applied to the inner wall part 74 due to the winding of the coil 24, deformation of the inner wall part 74 may be suppressed.

Here, the boundary line BL between the inclined part parallel part 95 and the tooth parallel part 96 is disposed along a part of the outer periphery of the pin contact recess 76 when viewed from the axial direction. Further, the tooth parallel part 96 is disposed on the back surface 71b in the region where the pin contact recess 76 exists. That is, the thickness T3 of the tooth end surface covering part 71 is constant in the region where the pin contact recess 76 exists. Further, T1=T3 is set.

A contact part 97 provided on the same plane as the lower surface 65a of the core end surface covering part 65 is formed on the back surface 71b. The contact part 97 is in contact with the tooth body 28. In addition, the inclined part parallel part 95 and the tooth parallel part 96 are further apart from the tooth body 28 in the axial direction than the contact part 97 is. In other words, the inclined part parallel part 95 and the tooth parallel part 96 are recessed with respect to the contact part 97.

The tooth side surface covering part 72 covers the circumferential side surface of the tooth body 28 of the tooth 22. The collar side surface covering part 73 covers the outer peripheral surface of the collar part 29 of the tooth 22.

The tooth side surface covering part 72 and the collar side surface covering part 73, and the core side surface covering part 66 of the core body covering part 63 are continuously formed to form a cylindrical skirt part 79 protruding downward from the tooth end surface covering part 71 and the core end surface covering part 65. That is, skirt part 79 is interposed in the slot 27 of the stator core 20.

A tip part (an example of a skirt tip part in the claims 79a, which is the lower end of the skirt part 79, is formed to be oblique so that the protruding height from the tooth end surface covering part 71 and the core end surface covering part 65 gradually changes along the circumferential direction. A flat part 79b parallel to the tooth end surface covering part 71 and the core end surface covering part 65 is formed at the tip part 79a of the skirt part 79 where the protruding height is the lowest.

Further, a parting line PL parallel to the tooth side surface covering part 72 and the collar side surface covering part 73 is set in the skirt part 79 nearer to the tip part 79a than the center in the vertical direction. The parting line PL is a part where an upper mold 91 and a lower mold 92 (see FIG. 12) of a mold 90 used when resin-molding the first insulator 61 are overlapped. In other words, the parting line PL is a line along which the mold 90 used for resin molding is divided.

A concave part 81 is formed on the inner side surface 79c of the skirt part 79 (the side surface of the tooth side surface covering part 72, the collar side surface covering part 73, and the core side surface covering part 66 opposite to the stator core 20) through a small stepped part 80 over the entirety from the parting line PL to the tip part 79a. In this way, the thickness of the skirt part 79 is slightly thinner at the lower part than at the upper part across the parting line PL. By forming the small stepped part 80 on the parting line PL, even when the parting line PL is set in the middle of the side surface of the resin molded product (skirt part 79), it is possible to suppress the occurrence of burrs at this parting line PL at the time of resin molding. In addition, the dimension of the small step part 80 is, for example, about 0.04 mm.

Figure 10:
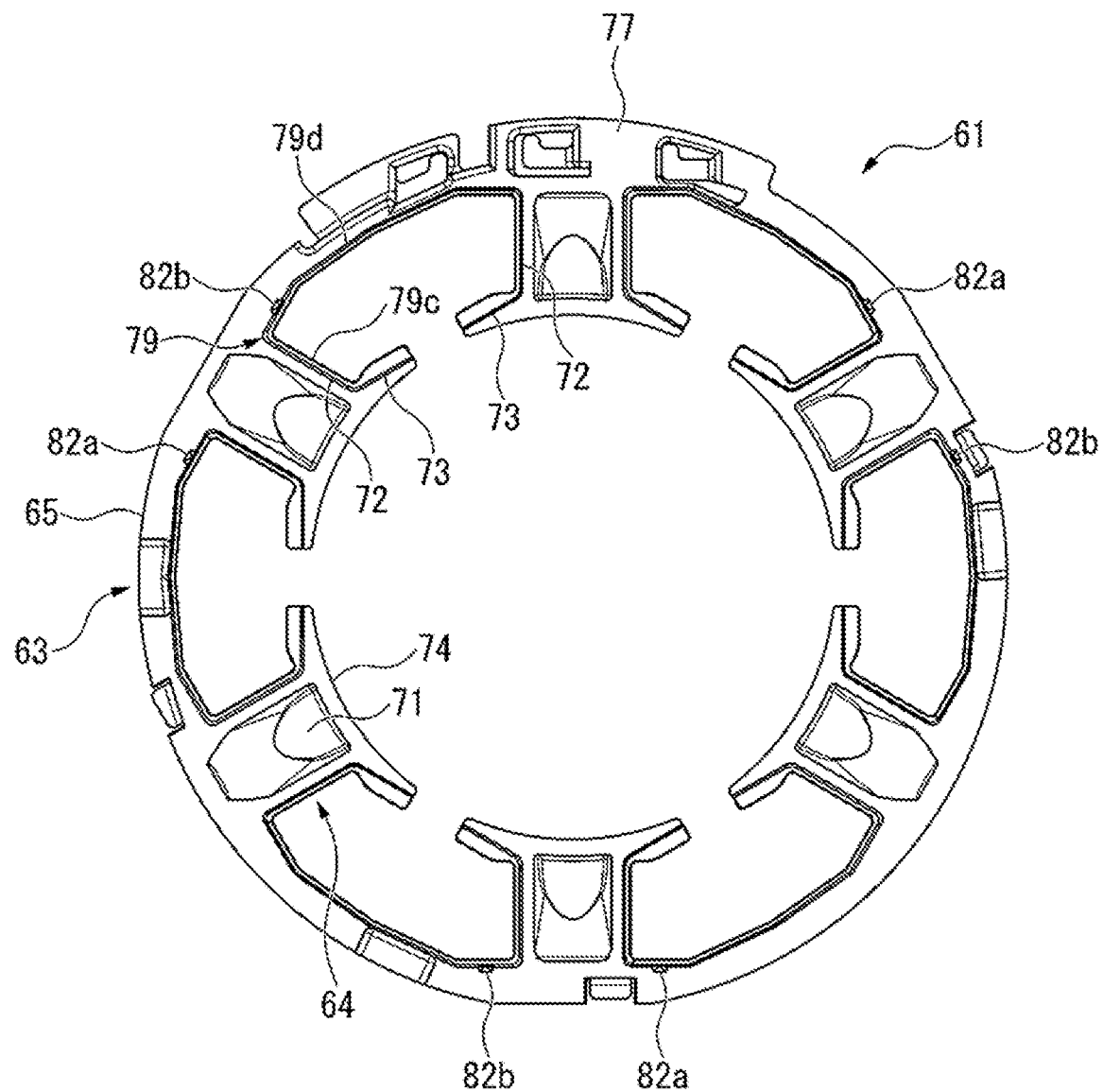
FIG. 10 is a view in the direction of the arrow X of FIG. 6.

FIG. 10 is a view in the direction of the arrow X of FIG. 6.

As shown in FIGS. 5, 6, and 10, a pair of press-fit protrusions 82a and 82b are formed on the outer side surface 79d of the skirt part 79 (the side surface of the tooth side surface covering part 72, the collar side surface covering part 73, and the core side surface covering part 66 on the stator core 20 side) near the tooth side surface covering part 72 of the core side surface covering part 66. The pair of press-fit protrusions 82a and 82b are disposed on two sides in the circumferential direction with the tooth covering part 64 interposed therebetween. These press-fit protrusions 82a and 82b are for press-fitting and mounting the first insulator 61 on the stator core 20. The press-fit protrusions 82a and 82b may prevent the first insulator 61 from coming off the stator core 20.

The pair of press-fit protrusions 82a and 82b are disposed at equal intervals in the circumferential direction every other tooth covering part 64, except for a part corresponding to the specific tooth 22A (specific tooth covering part 64A). In the first embodiment, since there are six teeth 22 (tooth covering parts 64), a pair of press-fit protrusions 82a and 82b are disposed at locations corresponding to three tooth covering parts 64 disposed at equal intervals in the circumferential direction except for the specific tooth covering part 64A.

Figure 11:
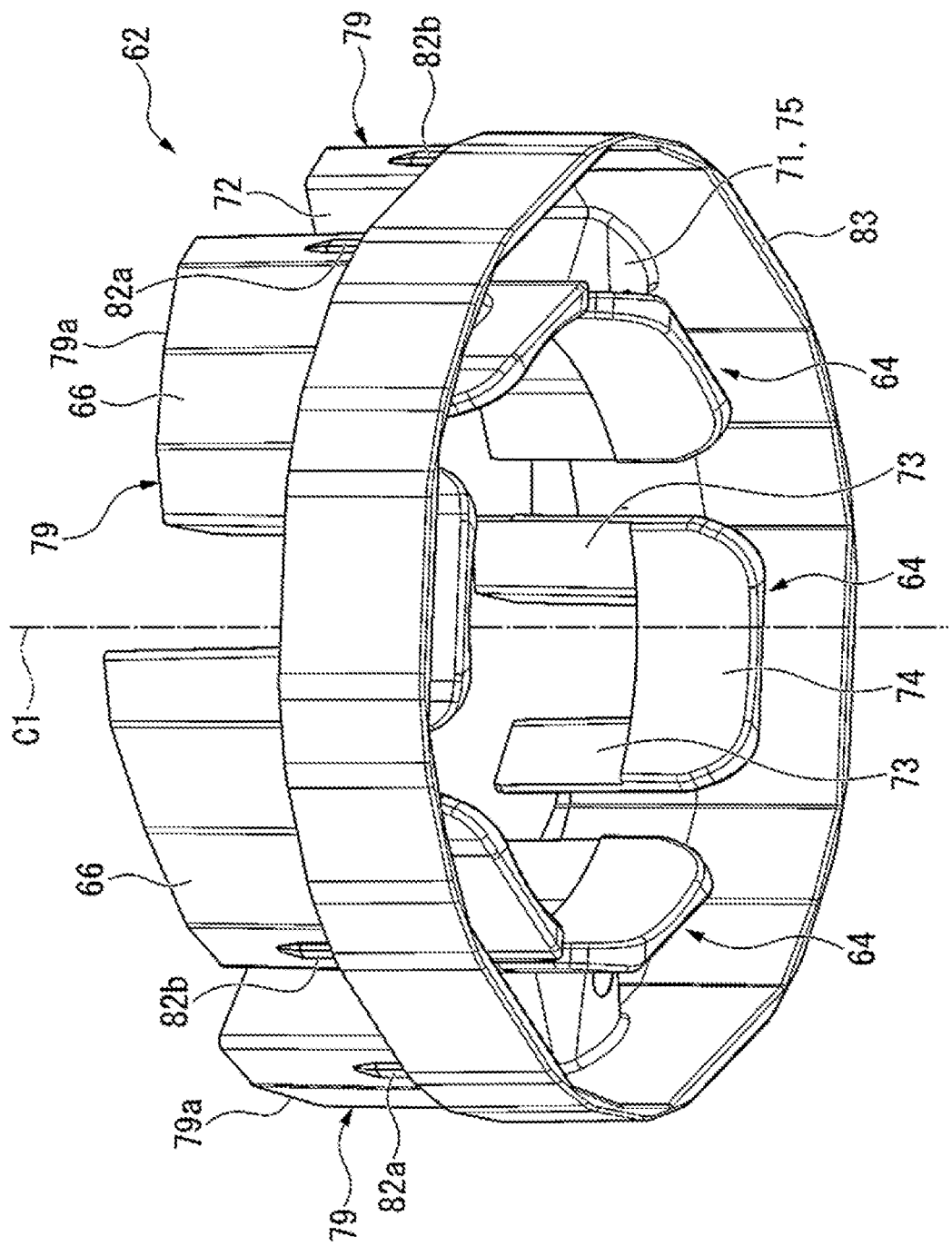
FIG. 11 is a perspective view of a second insulator according to a first embodiment of the disclosure.

FIG. 11 is a perspective view of the second insulator 62.

As shown in FIGS. 5 and 11, the basic configuration of the second insulator 62 is line-symmetrical with the first insulator 61 about the axial center (vertical center) of the stator core 20. Therefore, in the following description, the same reference numerals as those of the first insulator 61 are assigned to the same configurations of the second insulator 62 as those of the first insulator 61, and the description thereof is omitted.

The difference between the first insulator 61 and the second insulator 62 is that the outer wall part 67 of the first insulator 61 is formed with a pull-in slit 68 and a pull-out slit 69, whereas the outer wall part 83 of the second insulator 62 is not formed with the pull-in slit 68 or the pull-out slit 69.

Further, the tip part 79a of the skirt part 79 of the second insulator 62 is formed along the inclination direction of the tip part 79a of the skirt part 79 of the first insulator 61. Therefore, when the first insulator 61 and the second insulator 62 are attached from both sides in the axial direction of the stator core 20, a gap S (see FIG. 5) between the tip parts 79a of the skirt parts 79 that face each other is constant.

<Action of Insulator During Resin Molding>

Next, based on FIG. 12, the action of the insulator 26 (the first insulator 61 and the second insulator 62) during resin molding will be described.

Figure 12:
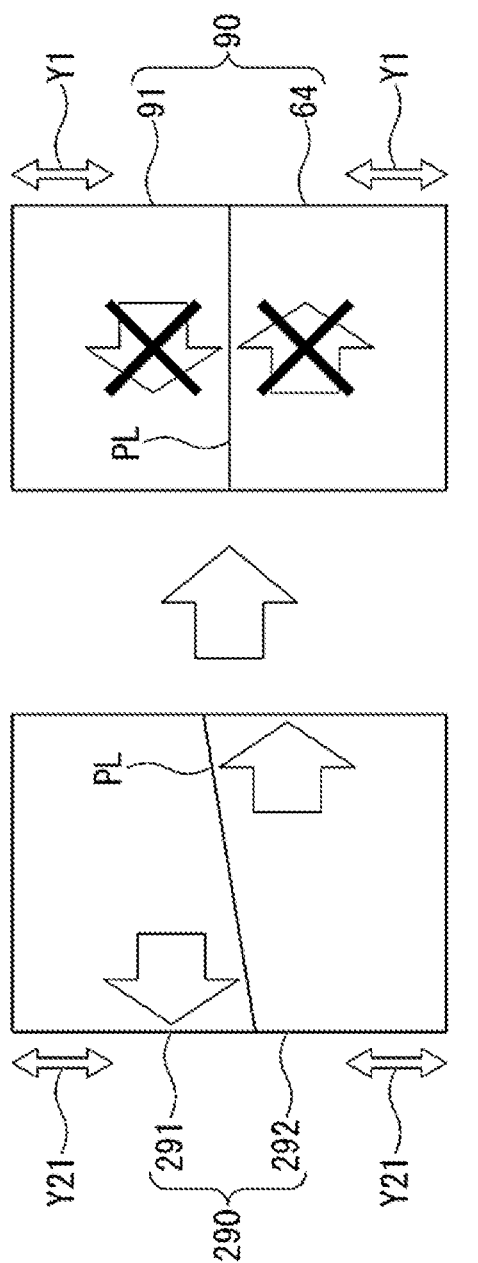
FIG. 12 is a comparison illustration view of the mold according to the first embodiment of the disclosure.

FIG. 12 is an illustration view comparing the mold 90 used for resin-molding the first insulator 61 and the second insulator 62 with a mold 290 of a comparative example.

A parting line PL parallel to the tooth side surface covering part 72 and the collar side surface covering part 73 is set on the skirt part 79 of each insulator 61 and 62. Therefore, as shown in FIG. 12, the parting line PL is perpendicular to the mold clamping and mold release direction Y1 between the upper mold 91 and the lower mold 92 in the mold 90. Therefore, when the mold 90 is clamped, no clamping force is applied to the upper mold 91 or the lower mold 92 in the direction perpendicular to the mold clamping and mold release direction Y1, and the positional deviation of the upper mold 91 or the lower mold 92 is prevented. Therefore, the resin molding accuracy of the insulator 26 is improved.

In contrast, for example, when the parting line PL is set on the skirt part 79 of each insulator 61 and 62 along the tip part 79a, as in the mold 290 of the comparative example, the mold clamping between the upper mold 291 and the lower mold 292 and the parting line PL are oblique to the mold release direction Y21, not perpendicular thereto. Therefore, when the mold 290 is clamped, a clamping force is applied to the upper mold 291 and the lower mold 292 in a direction perpendicular to the mold release direction Y21, and the upper mold 291 and the lower mold 292 may be displaced. Therefore, the resin molding accuracy of the insulator 26 is lowered.

By the way, when measuring the molding accuracy of the insulator 26, it is difficult to measure the skirt part 79 because the tip part 79a thereof is obliquely formed. That is, in measuring the skirt part 79, the reference position is the lower surface 65a of the core end surface covering part 65, for example. In this case, it is easy to identify the tip of the skirt part 79 protruding from the lower surface 65*a*, but it is difficult to identify the part where the protruding height of the skirt part 79 is lowest.

A more specific description will be given with reference to the enlarged part of FIG. 6. The enlarged part of FIG. 6 is viewed from a direction perpendicular to the axial direction for the sake of clarity of description, and the scale is appropriately changed.

For example, when the skirt part 79 is measured with the lower surface 65*a* of the core end surface covering part 65 as a reference using a three-dimensional measuring machine m or the like, the tip of the skirt part 79 is likely to come into contact with the probe Pr. In addition, since the probe Pr has a spherical shape, at the part where the protruding height of the skirt part 79 is the lowest, the probe Pr contacts a slightly higher inclined part than this point (see the contact point Pj in FIG. 6), and it becomes an obstacle when the probe Pr comes into contact with the part of the skirt part 79 where the protruding height is the lowest. Therefore, it is difficult to reliably bring the probe Pr into contact with the part of the skirt part 79 where the protruding height is the lowest.

Here, in the first embodiment, the flat part 79*b* is formed at the tip part 79*a* of the skirt part 79 where the protruding height is the lowest. Therefore, it is possible to easily identify the part where the skirt part 79 has the lowest protruding height. Further, when measuring the skirt part 79 with the lower surface 65*a* of the core end surface covering part 65 as a reference using, for example, a three-dimensional measuring machine m, the probe Pr may be reliably brought into contact with the part where the protruding height of the skirt part 79 is lowest. Therefore, the insulator 26 may be measured with high accuracy.

<Insulator Assembly and Action of the Insulator during Assembly>

Next, action of the insulator 26 during assembly will be described with reference to FIGS. 6, 10 and 13.

Figure 13:
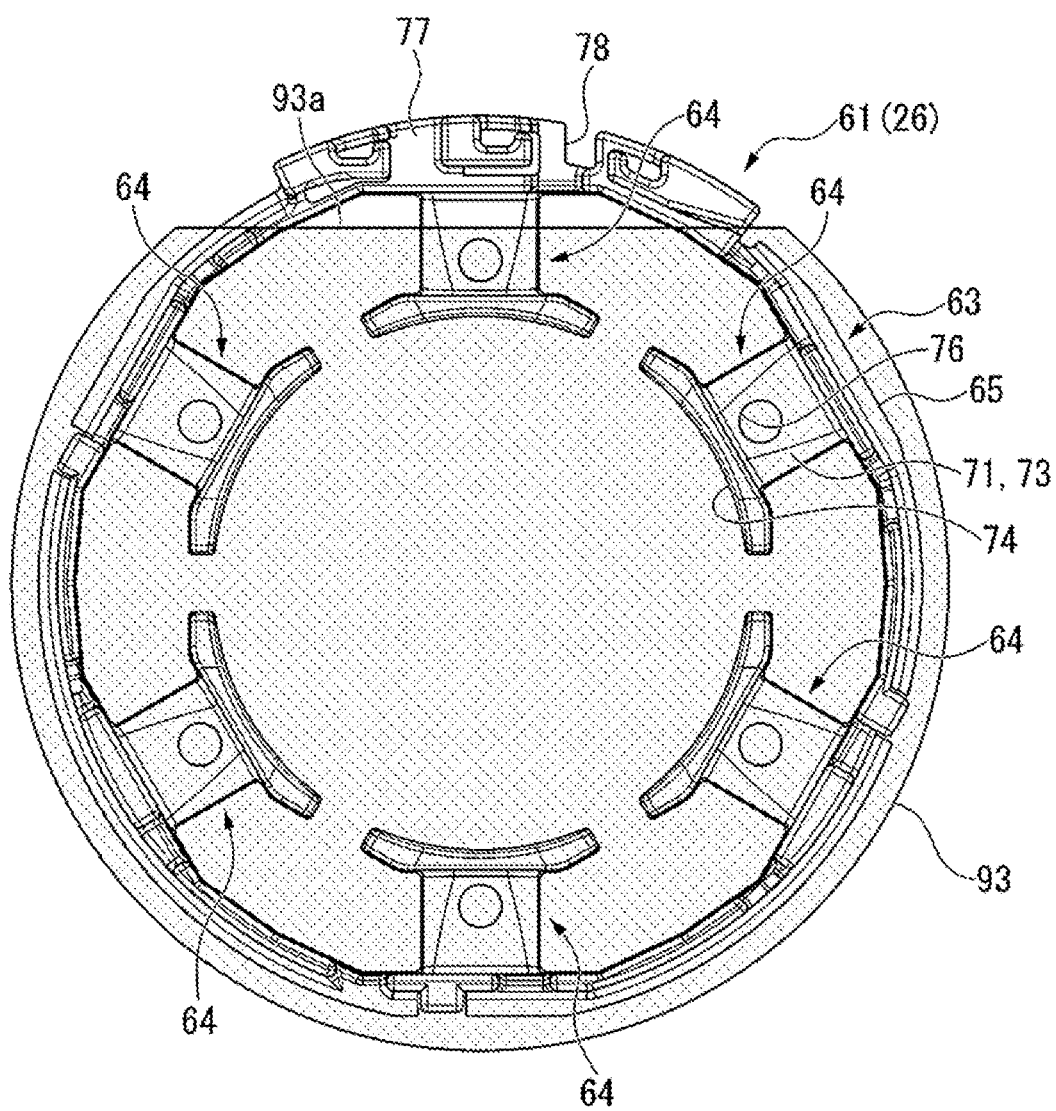
FIG. 13 is a plan view of the jig according to the first embodiment of the disclosure as viewed from the axial direction.

FIG. 13 is a plan view of a jig 93 used when assembling the first insulator 61 of the insulator 26 to the stator core 20 as viewed from the axial direction. The second insulator 62 is assembled to the stator core 20 in the same manner as the first insulator 61 using the same jig 93 as the first insulator 61, so the description thereof will be omitted.

As shown in FIGS. 6 and 13, when the first insulator 61 is assembled to the stator core 20, the skirt part 79 of the first insulator 61 is axially above stator core 20 and directed downward (toward the stator core 20 side). In this state, the jig 93 presses the outer wall part 67 of the first insulator 61 from above the first insulator 61.

The jig 93 is formed in a columnar shape to correspond to the shape of the first insulator 61. The outer diameter of the jig 93 is slightly larger than the outer diameter of the core end surface covering part 65 of the first insulator 61. A chamfered part 93*a* is formed in the jig 93 at a position corresponding to the coil pull-out part 77 of the first insulator 61. In this way, when the jig 93 presses the first insulator 61, the jig 93 may be prevented from coming into contact with the coil pull-out part 77, and the first insulator 61 may be stably pressed by the jig 93.

When the jig 93 presses the first insulator 61, the skirt part 79 is first inserted into the slot 27 of the stator core 20. At this time, since the tip part 79*a* of the skirt part 79 is formed obliquely, the tip part 79*a* of the skirt part 79 is not inserted into the slot 27 all at once. That is, the skirt part 79 is gradually inserted into the slot 27 from the tip of the skirt part 79. Therefore, the tip part 79*a* of the skirt part 79 serves as a guide, and the skirt part 79 is smoothly inserted into the slot 27.

When the jig 93 presses the first insulator 61, the outer side surface 79*d* of the skirt part 79 is fitted to the stator core 20. At this time, the first insulator 61 is press-fitted into the stator core 20 by the press-fit protrusions 82*a* and 82*b* formed on the skirt part 79.

Here, the chamfered part 93*a* is formed in the jig 93 at a position corresponding to the coil pull-out part 77 of the first insulator 61. Therefore, the jig 93 does not press the specific tooth covering part 64A where the coil pull-out part 77 is disposed and the periphery of the specific tooth covering part 64A.

In addition, the press-fit protrusions 82*a* and 82*b* are disposed at equal intervals in the circumferential direction every other tooth covering part 64, except for the part corresponding to the specific tooth covering part 64A. Therefore, the press-fit protrusions 82*a* and 82*b* are evenly pressed. In addition, slight deformation of the first insulator 61 that occurs when the press-fit protrusions 82*a* and 82*b* are pushed into the stator core 20 is evenly dispersed on the tooth covering part 64 where the press-fit protrusions 82*a* and 82*b* are not formed and on the periphery of this tooth covering part 64. In this way, the first insulator 61 is reliably press-fitted into the stator core 20 and attached.

<Winding Method of Coil and Detailed Positions of Pull-In Slit and Pull-Out Slit>

Next, a winding method of the coil 24 wound from above the insulator 26 attached to the stator core 20 and the detailed positions of the pull-in slit 68 and the pull-out slit 69 formed in the first insulator 61 of the insulator 26 will be described based on FIGS. 4 and 14 to 19.

First, as shown in FIG. 4, as a method of winding the coil 24, the coil 24 is wound around the tooth 22 from above the insulators 61 and 62 by a so-called concentrated winding method. More specifically, the coils 24 of each phase are wound in series on the teeth 22 of the corresponding phase while being routed over the core end surface covering part 65 of the first insulator 61.

That is, for example, since the electric motor 2 of the first embodiment has a three-phase structure, the teeth 22 of the same phase are disposed every two teeth 22 in the circumferential direction. For example, since there are six teeth 22 in the first embodiment, the coil 24 of each phase is continuously wound around the two teeth 22 while being routed over the core end surface covering part 65 of the first insulator 61.

At this time, the coil 24 routed over the core end surface covering part 65 of the first insulator 61 is pulled toward the tooth covering part 64 through the pull-in slit 68 of the first insulator 61. Then, the coil 24 is wound around the tooth 22 from above the tooth covering part 64.

After that, the coil 24 wound around the tooth covering part 64 (tooth 22) is pulled out again onto the core end surface covering part 65 via the pull-out slit 69 of the first insulator 61. Then, the coil is guided to the terminal 86 of the terminal holder 85 via the coil guide recess 78 and connected to the terminal 86.

The coil 24 pulled into the pull-in slit 68 may be routed over the core end surface covering part 65 to straddle the base of the corresponding tooth covering part 64 (tooth 22) (counterclockwise CCW in FIG. 4). After that, it may be pulled into the tooth covering part 64 side through the pull-in slit 68. Hereinafter, this case will be referred to as the case where the coil 24 is routed counterclockwise CCW.

Further, the coil 24 pulled into the pull-in slit 68 may be routed over the core end surface covering part 65 from the direction opposite to the corresponding tooth covering part 64 (tooth 22) (clockwise CW in FIG. 4). After that, it may be pulled into the tooth covering part 64 side through the pull-in slit 68. Hereinafter, this case will be referred to as the case where the coil 24 is routed clockwise CW.

Next, the detailed position of the pull-in slit 68 will be described with reference to FIGS. 14 to 17.

Figure 14:
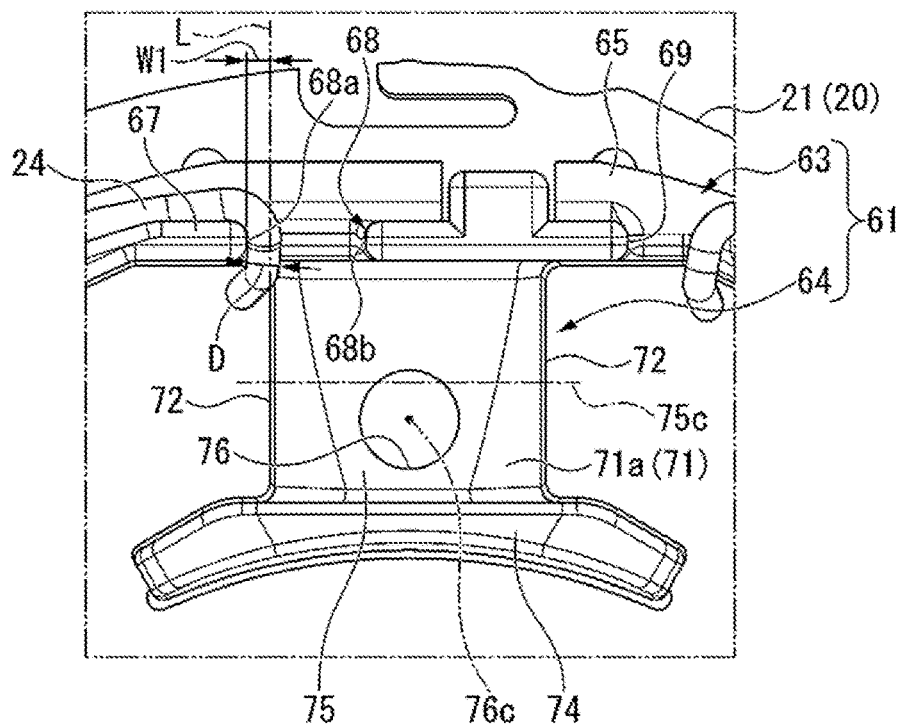
FIG. 14 is a plan view showing a state in which the coil is pulled into the pull-in slit when the coil is routed clockwise according to the first embodiment of the disclosure.
Figure 15:
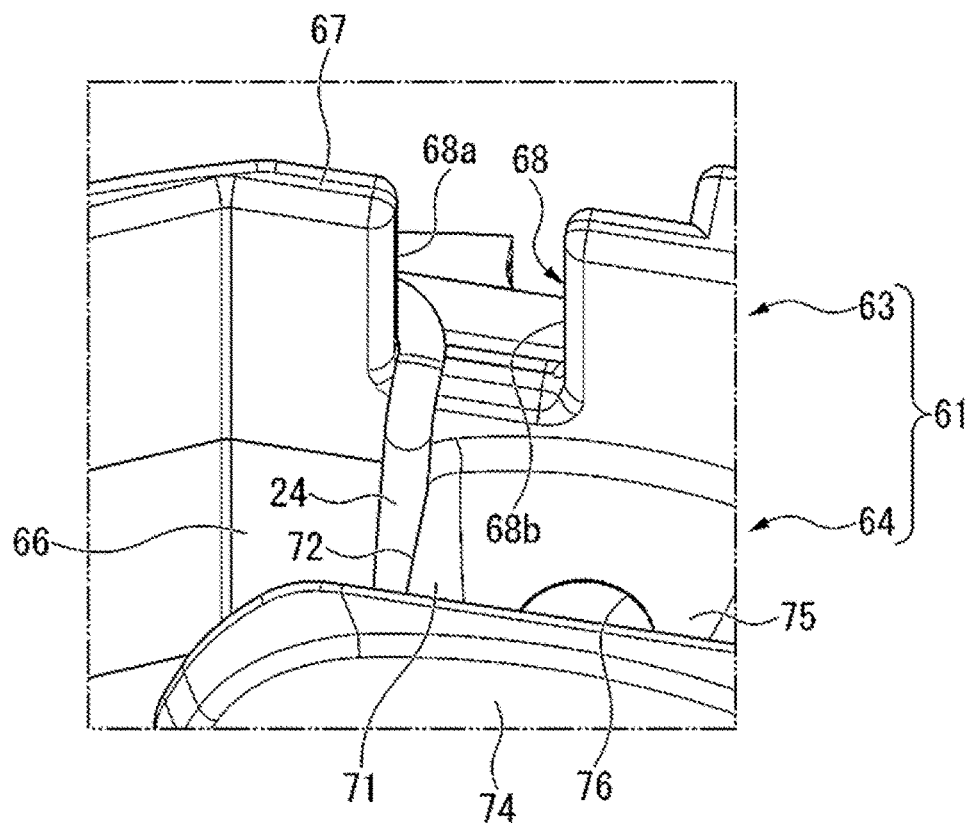
FIG. 15 is a perspective view showing a state in which the coil is pulled into the pull-in slit when the coil is routed clockwise according to the first embodiment of the disclosure.
Figure 16:
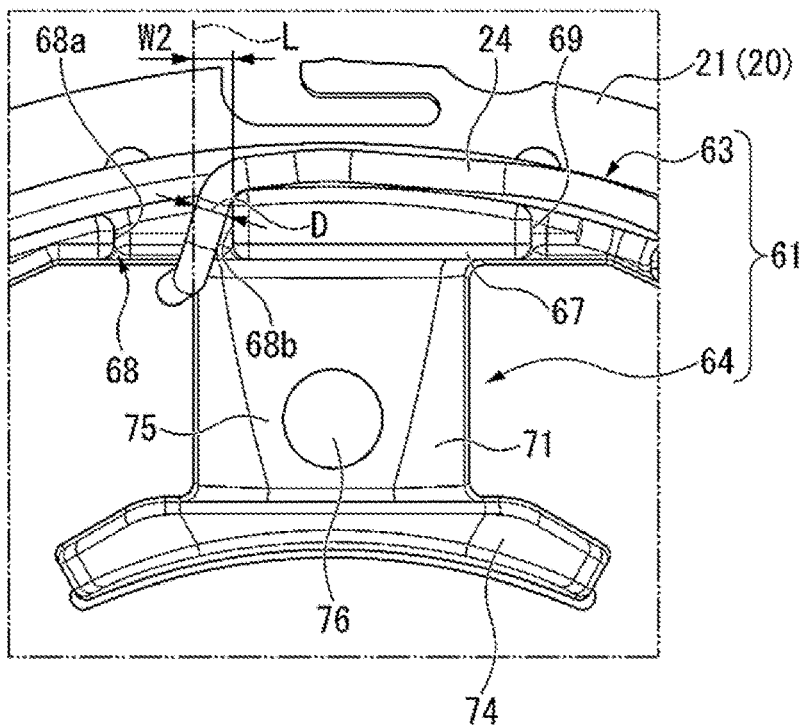
FIG. 16 is a plan view showing a state in which the coil is pulled into the pull-in slit when the coil is routed counterclockwise according to the first embodiment of the disclosure.
Figure 17:
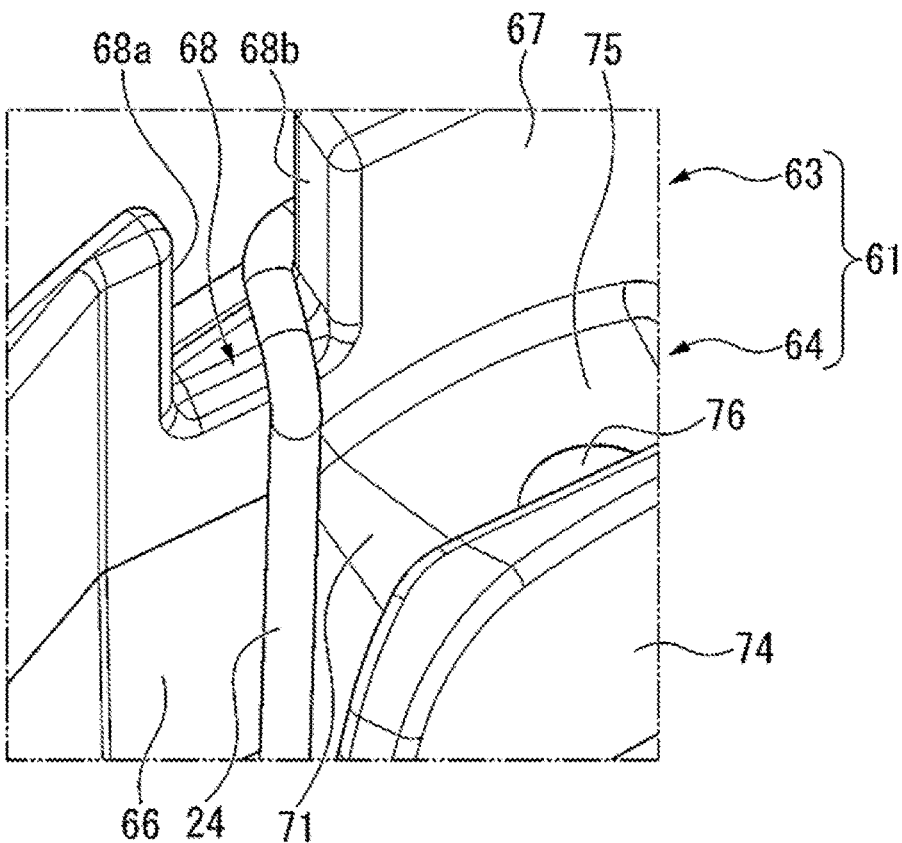
FIG. 17 is a perspective view showing a state in which the coil is pulled into the pull-in slit when the coil is routed clockwise according to the first embodiment of the disclosure.

FIG. 14 is a plan view of the first insulator 61 viewed from the axial direction, showing a state in which the coil 24 is pulled into the pull-in slit 68 when the coil 24 is routed clockwise CW. FIG. 15 is a perspective view of the first insulator 61 showing a state in which the coil 24 is pulled into the pull-in slit 68 when the coil 24 is routed clockwise CW. FIG. 16 is a plan view of the first insulator 61 viewed from the axial direction, showing a state in which the coil 24 is pulled into the pull-in slit 68 when the coil 24 is routed counterclockwise CCW. FIG. 17 is a perspective view of the first insulator 61 showing a state in which the coil 24 is pulled into the pull-in slit 68 when the coil 24 is routed counterclockwise CCW.

As shown in FIGS. 14 to 17, the pull-in slit 68 is disposed on a side surface covering part straight line L passing through the tooth side surface covering part 72 of the corresponding tooth covering part 64 when viewed from the axial direction. More specifically, when viewed from the axial direction, the first side 68a and the second side 68b facing each other in the circumferential direction of the pull-in slit 68 are disposed on two sides of the side surface covering part straight line L.

Here, the position of the pull-in slit 68 is slightly different depending on the routing direction of the coil 24 pulled into the pull-in slit 68.

As shown in FIG. 14, the pull-in slit 68 into which the coil 24 routed clockwise CW is pulled is disposed so that its width W1 between the side surface covering part straight line L and the first side 68a when viewed from the axial direction is smaller than the wire diameter D of the coil 24.

Therefore, as shown in FIGS. 14 and 15, the coil 24 that is routed clockwise CW is pulled in through the pull-in slit 68 to the tooth covering part 64 side, and then is wound on the tooth covering part 64 along the tooth side surface covering part 72 on the side surface covering part straight line L in a slightly folded manner. Therefore, the coil 24 is wound on the tooth covering part 64 at the base of the tooth 22. The occurrence of a gap between the tooth covering part 64 and the coil 24 is suppressed as much as possible.

As shown in FIG. 16, the pull-in slit 68 into which the coil 24 routed counterclockwise CCW is pulled is disposed so that its width W2 between the side surface covering part straight line L and the second side 68b when viewed from the axial direction is larger than the wire diameter D of the coil 24.

Therefore, as shown in FIGS. 16 and 17, the coil 24 that is routed counterclockwise CCW is pulled in through the pull-in slit 68 to the tooth covering part 64 side, and then is wound on the tooth covering part 64 along the tooth side surface covering part 72 on the side surface covering part straight line L in such a manner as to ride on the tooth end surface covering part 71. Therefore, the coil 24 is wound on the tooth covering part 64 at the base of the tooth 22. The occurrence of a gap between the tooth covering part 64 and the coil 24 is suppressed as much as possible.

Next, the detailed position of the pull-out slit 69 will be described with reference to FIGS. 18 and 19.

Figure 18:
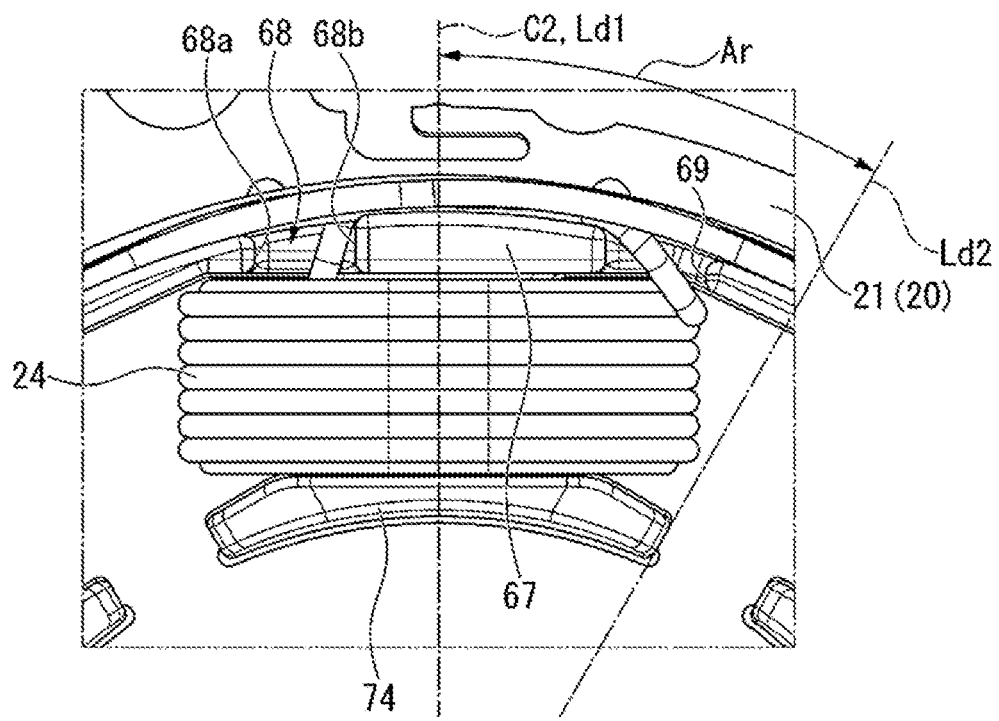
FIG. 18 is a plan view showing a state in which the coil is pulled out through the pull-out slit and routed counterclockwise according to the first embodiment of the disclosure.

FIG. 18 is a plan view of the first insulator 61 viewed from the axial direction, showing a state in which the coil 24 routed clockwise CW is pulled through the pull-in slit 68 to the tooth covering part 64 side and then pulled out through the pull-out slit 69. FIG. 19 is a plan view of the first insulator 61 viewed from the axial direction, showing a state in which the coil 24 routed counterclockwise CCW is pulled in through the pull-in slit 68 to the tooth covering part 64 side, and then pulled out through the pull-out slit 69.

As shown in FIG. 18, the coil 24 that has been routed clockwise CW and wound through the pull-in slit 68 is pulled out radially outward through the pull-out slit 69 and then routed clockwise CW again.

Figure 19:
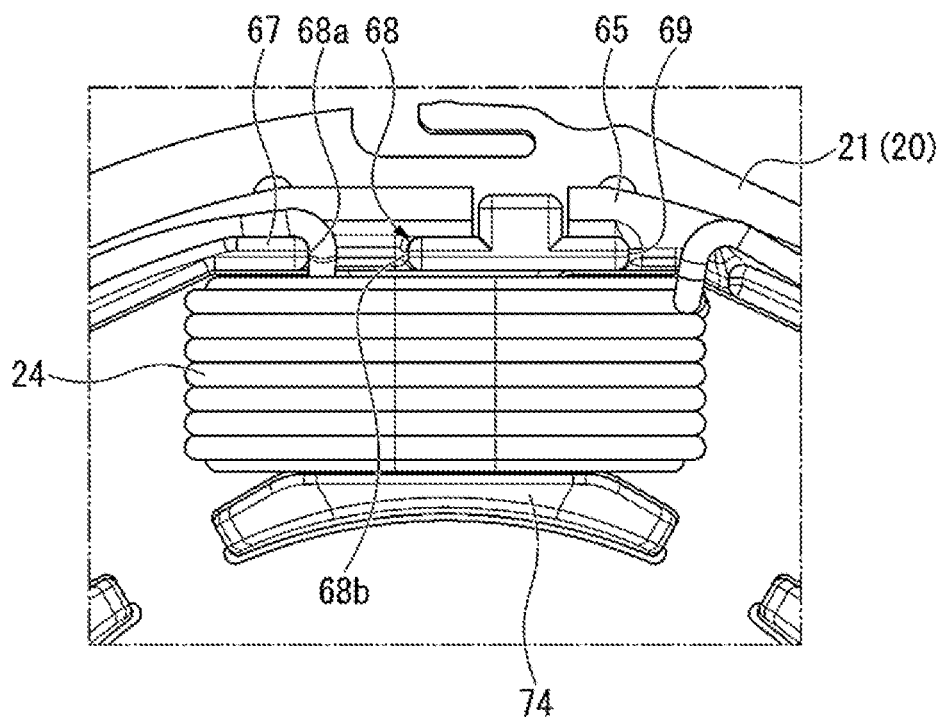
FIG. 19 is a plan view showing a state in which the coil is pulled out through the pull-out slit and routed clockwise according to the first embodiment of the disclosure.

As shown in FIG. 19, the coil 24 that has been routed counterclockwise CCW and wound through the pull-in slit 68 is pulled out radially outward through the pull-out slit 69 and then routed counterclockwise CCW again.

Here, as shown in FIGS. 18 and 19, the position of the pull-out slit 69 does not change whether the coil 24 is routed clockwise CW or counterclockwise CCW. That is, the pull-out slit 69 is disposed on the side opposite to the pull-in slit 68 across the circumferential center C2 of the tooth covering part 64 (the tooth body 28 of the tooth 22). In addition, the pull-in slit 69 is disposed in an area Ar between a first straight line Ld1 passing through the circumferential center C2 of the tooth covering part 64 and the rotation axis C1, and a second straight line Ld2 passing through the circumferential end of the collar part 29 of the tooth 22 and the rotation axis C1. Therefore, when the coil 24 wound around the tooth 22 is pulled out radially outward through the pull-out slit 69, there is no large gap between the pulled-out coil 24 and the wound coil 24.

<Winding State of Coil and Action of Inclined Part>

Next, the winding state of the coil 24 and the action of the inclined parts 75 in the insulators 61 and 62 will be described with reference to FIGS. 20, 21A, and 21B.

Figure 20:
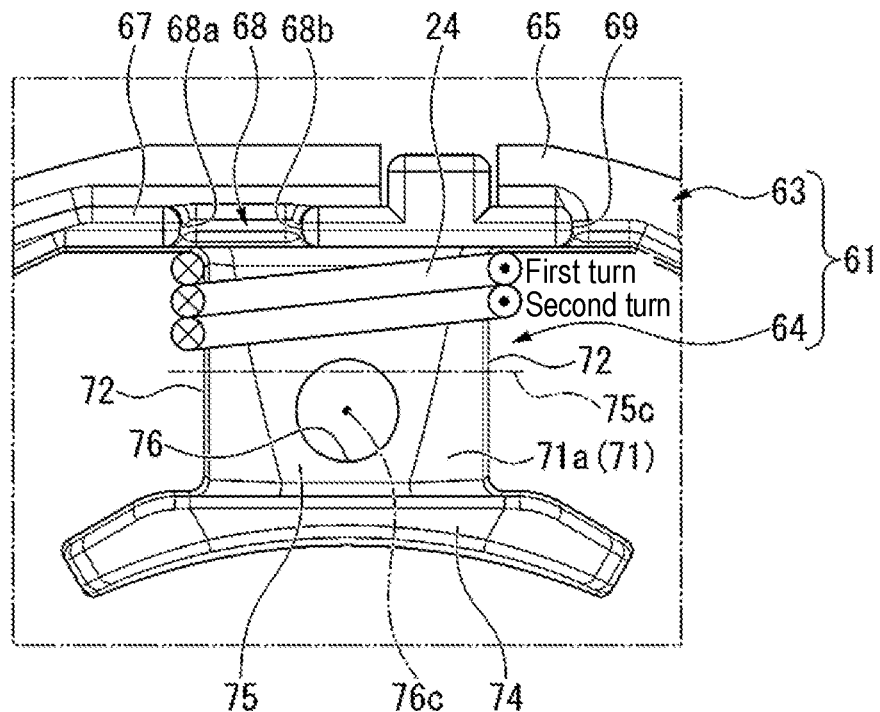
FIG. 20 is an illustration view showing the winding state of the coil on the insulator according to the first embodiment of the disclosure.

FIG. 20 is an illustration view showing the winding state of the coil 24 on the insulator 26. FIG. 20 corresponds to a plan view of the first insulator 61 viewed from above. FIG. 21A is an illustration view of the inclination angle of the inclined part 75. FIG. 21B is an illustration view of the inclination angle of a comparative example.

As shown in FIG. 20, the coil 24 is spirally wound in order from the base side of the tooth 22 (the tooth covering part 64) to the radially inner side.

Figure 21A:
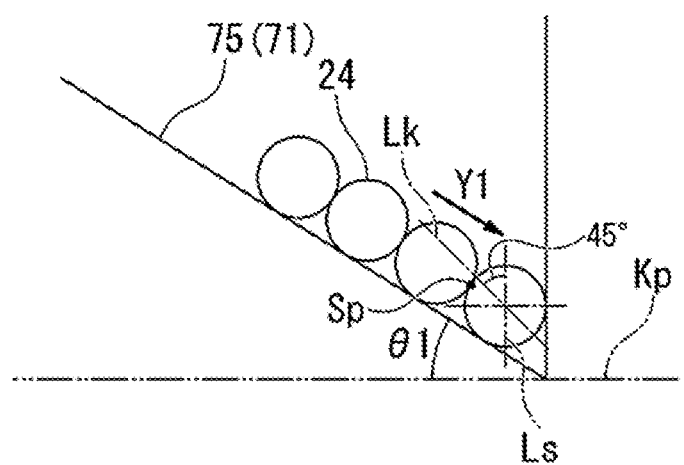
FIG. 21A is an illustration view of an inclination angle of an inclined part according to the embodiment of the disclosure.

At this time, as shown in FIG. 21A, the inclined part 75 formed on the tooth end surface covering part 71 allows the coil 24 to slide down toward the base of the tooth 22 and be wound forward (see arrow Y1 in FIG. 21A). That is, the coil 24 is wound while being packed toward the base of the teeth 22. Therefore, no unnecessary gap is formed between the wound coil 24.

Moreover, the center 76c of the pin contact recess 76 used when resin-molding the insulator 26 is located radially inside the radial center 75c of the inclined part 75. Further, the pin contact recess 76 is formed to fit on the inclined part 75. Since the pin contact recess 76 is disposed radially inside, the diameter is smaller than when it is disposed radially outside. As a result, the coil 24 smoothly slides down toward the base of the tooth 22 along the inclined part 75 as compared with the case where the center 76c of the pin contact recess 76 is located radially outward of the radial center 75c of the inclined part 75.

Here, the inclination angle $\theta 1$ of the inclined part 75 is smaller than 45°. Further, Lk is defined as an inclined straight line that is inclined by 45° with respect to a vertical straight line Ls that passes through the center of the coil 24 and is parallel to the rotation axis C1. The contact point Sp of the later-wound coil 24 (hereinafter referred to as the later coil 24) with respect to the earlier-wound coil 24 (hereinafter referred to as the earlier coil 24) is located axially inside the inclined straight line Lk of the earlier coil 24. Therefore, the later coil 24 does not ride over the earlier coil 24.

Figure 21B:
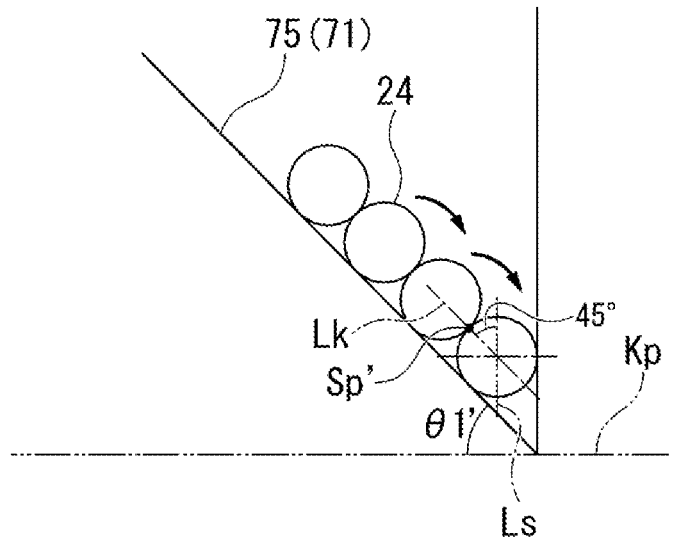
FIG. 21B is an illustration view of an inclination angle of an inclined part according to a comparative example.

For example, as shown in FIG. 21B, when the inclination angle θ1' of the inclined part 75 is greater than 45°, the contact point Sp' of the later coil 24 with respect to the earlier coil 24 is located on the inclined straight line Lk of the coil 24 or axially outside the inclined straight line Lk. Therefore, the later coil 24 may ride over the earlier coil 24. Therefore, by setting the inclination angle θ1 of the inclined part 75 to be smaller than 45°, the wound coil 24 is prevented from being unwound.

Under such a configuration, interlinkage magnetic flux is formed in the stator core 20 when power is supplied to each coil 24 via the controller 4. Magnetic attraction and repulsion are generated between this interlinkage magnetic flux and the magnet (not shown) of the rotor 9, and the rotor 9 is continuously rotated.

When the rotor 9 is rotated, the worm shaft 44 integrated with the shaft 31 is rotated. Further, the worm wheel 45 meshed with the worm shaft 44 is rotated. Rotation of the worm wheel 45 is transmitted to the output shaft 48 connected to the worm wheel 45. In this way, a desired electrical component connected to the output shaft 48 is driven.

As described above, in the above-described first embodiment, the inclined parts 75 are formed on the front surfaces 71a of the tooth end surface covering parts 71 of the insulators 61 and 62. The inclined part 75 is inclined such that the height from the axial end surface of the tooth body 28 gradually decreases radially outward. Further, the back surface 71b of the tooth end surface covering part 71 is formed with the inclined part parallel part 95 and the tooth parallel part 96. Since the inclined part parallel part 95 is formed parallel to the inclined part 75, the thickness T1 of the tooth end surface covering part 71 is constant in the region where the inclined part parallel part 95 exists. Furthermore, since the tooth parallel part 96 is formed parallel to the pin contact recess 76, the thickness T3 of the tooth end surface covering part 71 is constant in the region where the pin contact recess 76 exists. Therefore, the height of the inclined part 75 from the axial end surface of the tooth body 28 is formed to gradually decrease toward the radially outer side, and even if the pin contact recess 76 is formed parallel to the upper end of the tooth body 28, the thickness of most of the tooth end surface covering parts 71 may be made constant. That is, it is possible to prevent an increase in the thickness of the inclined parts 75 of the insulators 61 and 62. As a result, deterioration of moldability due to heat sink marks or the like may be suppressed when the insulators 61 and 62 are resin-molded. The resin molding accuracy of the insulators 61 and 62 may be improved.

Since the resin molding accuracy of the insulators 61 and 62 may be improved, it is possible to contribute to Goal 12 of Sustainable Development Goals (SDGs) led by the United Nations, "ensure sustainable consumption and production patterns."

The teeth 22 radially protrude from the inner peripheral surface of the core body 21. In contrast, the inclined part 75 is inclined such that the height from the axial end surface of the tooth body 28 gradually decreases radially outward. The coil 24 wound from above the insulator 26 starts winding from the base side of the teeth 22. Therefore, the coil 24 is wound while being packed toward the base of the teeth 22. It is possible to prevent unnecessary gaps from being formed between the wound coil 24. Therefore, the space factor of the coil 24 may be reliably improved.

The inclination angle θ1 of the inclined part 75 is smaller than 45°. Therefore, the contact point Sp of the later coil 24 with respect to the earlier coil 24 may be located axially inside the inclined straight line Lk of the earlier coil 24. Therefore, it is possible to prevent the later coil 24 from riding over the earlier coil 24, and prevent the unwinding of the coil 24.

The tip part 79a of the skirt part 79 formed on each insulator 61 and 62 is formed to be oblique so that the protruding height from the tooth end surface covering part 71 and the core end surface covering part 65 gradually changes along the circumferential direction. Therefore, when the skirt part 79 is inserted into the slot 27 of the stator core 20 (when the insulators 61 and 62 are attached to the core body 21 and the teeth 22), the skirt part 79 may be gradually inserted into the slot 27 from the tip of the skirt part 79. Therefore, the tip part 79a of the skirt part 79 serves as a guide, and the insulators 61 and 62 of the stator core 20 may be easily attached.

Further, the flat part 79b parallel to the tooth end surface covering part 71 and the core end surface covering part 65 is formed at the tip part 79a of the skirt part 79 where the protruding height is the lowest. Therefore, it is possible to easily identify the part where the skirt part 79 has the lowest protruding height. Further, when measuring the skirt part 79 with the lower surface 65a of the core end surface covering part 65 as a reference using, for example, a three-dimensional measuring machine m, the probe Pr may be reliably brought into contact with the part where the protruding height of the skirt part 79 is lowest. Therefore, the insulator 26 may be measured with high accuracy.

While the tip part 79a of the skirt part 79 is formed obliquely, a parting line PL parallel to the tooth side surface covering part 72 and the collar side surface covering part 73 is set on the skirt part 79. Therefore, the parting line PL may be perpendicular to the mold clamping and mold release direction Y1 between the upper mold 91 and the lower mold 92 in the mold 90. Therefore, when the mold 90 is clamped, no clamping force is applied to the upper mold 91 or the lower mold 92 in the direction perpendicular to the mold clamping and mold release direction Y1, and the positional deviation of the upper mold 91 or the lower mold 92 may be prevented. Therefore, the resin molding accuracy of the insulator 26 may be improved.

Further, the concave part 81 is formed on the inner side surface 79c of the skirt part 79 (the side surface of the tooth side surface covering part 72, the collar side surface covering part 73, and the core side surface covering part 66 opposite to the stator core 20) through the small stepped part 80 over the entirety from the parting line PL to the tip part 79a. Therefore, even when the parting line PL is set in the middle of the side surface of the resin molded product (skirt part 79), it is possible to suppress the occurrence of burrs at this parting line PL at the time of resin molding.

The core end surface covering part 65 and the outer wall part 67 are integrally formed with a coil pull-out part 77 collectively disposed at the base of the specific tooth 22A (the specific tooth covering part 64A). The pair of press-fit protrusions 82a and 82b for press-fitting each insulator 61 and 62 into the stator core 20 are disposed at equal intervals in the circumferential direction every other tooth covering part 64, except for a part corresponding to the specific tooth 22A (specific tooth covering part 64A).

By forming the press-fit protrusions 82a and 82b, the insulators 61 and 62 are press fitted when attached to the stator core 20 (core body 21). Therefore, the insulators 61 and 62 are less likely to come off from the stator core 20.

In addition, since the pair of press-fit protrusions 82a and 82b are disposed at equal intervals in the circumferential direction for every tooth covering part 64, the jig 93 may evenly press the press-fit protrusions 82a and 82b. In addition, slight deformation of the first insulator 61 that occurs when the press-fit protrusions 82a and 82b are pushed into the stator core 20 (core body 21) may be evenly dispersed on the tooth covering part 64 where the press-fit protrusions 82a and 82b are not formed and on the periphery of this tooth covering part 64. As a result, distorted deformation of the insulators 61 and 62 may be suppressed.

Moreover, for example, when the insulators 61 and 62 are pressed using the jig 93, the jig 93 is pressed while avoiding the coil pull-out part 77, which is a part of the deformed part (see FIG. 13). Therefore, by forming the press-fit protrusions 82a and 82b while avoiding the specific tooth 22A on which the coil pull-out part 77 is disposed, the press-fit protrusions 82a and 82b may be evenly pressed by the jig 93. Therefore, the insulators 61 and 62 may be reliably attached to the stator core 20 (core body 21).

The center 76c of the pin contact recess 76 used when resin-molding the insulator 26 is located radially inside the radial center 75c of the inclined part 75. Further, the pin contact recess 76 is formed to fit on the inclined part 75. Since the pin contact recess 76 is disposed radially inside, the diameter is smaller than when it is disposed radially outside. As a result, the coil 24 smoothly slides down toward the base of the tooth 22 along the inclined part 75 as compared with the case where the center 76c of the pin contact recess 76 is located radially outward of the radial center 75c of the inclined part 75. That is, when the coil 24 is moved in one direction along the inclined part 75, it is possible to prevent the pin contact recess 76 from hindering the movement of the coil 24. Therefore, the coil 24 may be disposed on the inclined part 75 without a gap.

The pull-in slit 68 into which the coil 24 routed clockwise CW is pulled is disposed so that its width W1 between the side surface covering part straight line L and the first side 68a when viewed from the axial direction is smaller than the wire diameter D of the coil 24. Therefore, the coil 24 that is routed clockwise CW is pulled in through the pull-in slit 68 to the tooth covering part 64 side, and then is wound on the tooth covering part 64 along the tooth side surface covering part 72 on the side surface covering part straight line L in a slightly folded manner. Therefore, the coil 24 is wound on the tooth covering part 64 at the base of the tooth 22. The occurrence of a gap between the tooth covering part 64 and the coil 24 may be suppressed as much as possible. Therefore, the insulator 26 and the coil 24 may be brought into close contact with each other at the base of the tooth 22, and the space factor of the coil 24 may be improved.

The pull-in slit 68 into which the coil 24 routed counterclockwise CCW is pulled is disposed so that its width W2 between the side surface covering part straight line L and the second side 68b when viewed from the axial direction is larger than the wire diameter D of the coil 24. Therefore, the coil 24 that is routed counterclockwise CCW is pulled in through the pull-in slit 68 to the tooth covering part 64 side, and then is wound on the tooth covering part 64 along the tooth side surface covering part 72 on the side surface covering part straight line L in such a manner as to ride on the tooth end surface covering part 71. Therefore, the coil 24 is wound on the tooth covering part 64 at the base of the tooth 22. The occurrence of a gap between the tooth covering part 64 and the coil 24 may be suppressed as much as possible. Therefore, the insulator 26 and the coil 24 may be brought into close contact with each other at the base of the tooth 22, and the space factor of the coil 24 may be improved.

The pull-in slit 69 is disposed in an area Ar between the first straight line Ld1 passing through the circumferential center C2 of the tooth covering part 64 and the rotation axis C1, and the second straight line Ld2 passing through the circumferential end of the collar part 29 of the tooth 22 and the rotation axis C1. Therefore, when the coil 24 wound around the tooth 22 is pulled out radially outward through the pull-out slit 69, it is possible to suppress a large gap between the pulled-out coil 24 and the wound coil 24. Therefore, the coil 24 wound around the tooth 22 may be reliably wound, and the space factor of the coil 24 may be improved.

By improving the space factor of the coil 24, the torque performance of the electric motor 2 may be improved. Therefore, energy consumption when the electric motor 2 is driven may be suppressed. Therefore, it is possible to contribute to Goal 7 of the Sustainable Development Goals (SDGs) led by the United Nations, "ensure access to affordable, reliable, sustainable and modern energy for all."

Second Embodiment

Next, a second embodiment of the disclosure will be described based on FIGS. 22 and 23. The same reference numerals are assigned to the same configurations as in the first embodiment.

Figure 22:
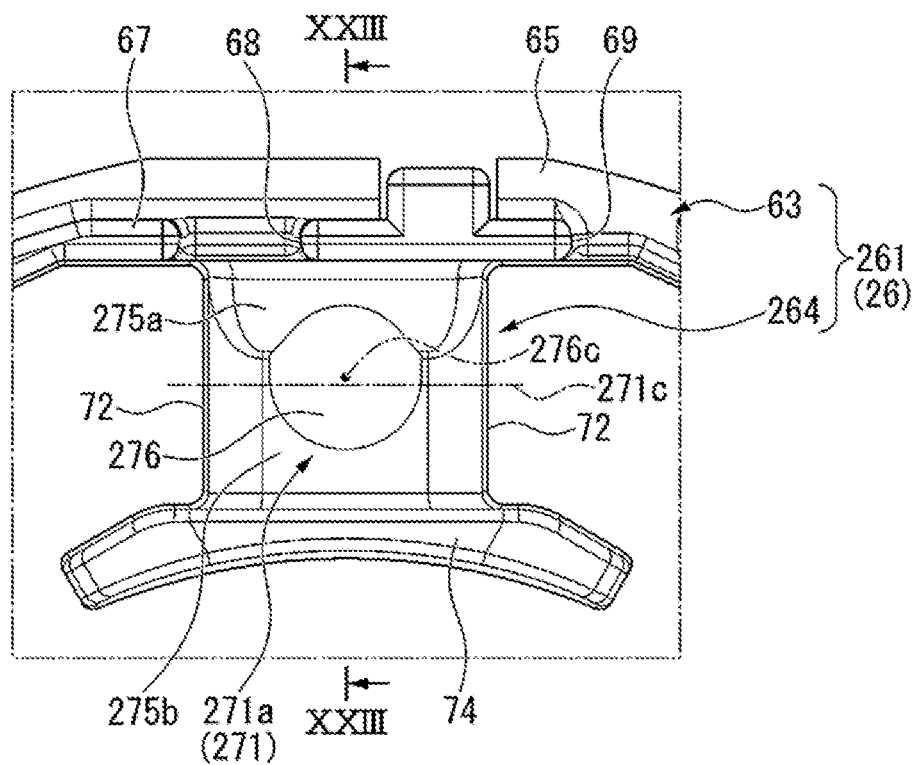
FIG. 22 is a plan view of the first insulator according to the second embodiment of the disclosure as viewed from the axial direction.

FIG. 22 is a plan view of a tooth covering part 264 of a first insulator 261 according to the second embodiment as viewed from the axial direction. FIG. 23 is a cross-sectional view taken along the line XXIII-XXIII of FIG. 22.

The second embodiment has the same basic configuration as that of the above-described first embodiment, in that the stator 8 includes a cylindrical stator core 20 whose center axis coincides with the rotation axis C1, an insulator 26 attached to the stator core 20, and multiple coils 24 having a three-phase (U-phase, V-phase, W-phase) structure wound around the stator core 20 from above the insulator 26, and in that the insulator 26 includes a first insulator 61 attached from one axial side of the stator core 20 and a second insulator 62 attached from the other axial side of the stator core 20.

As in the first embodiment described above, the basic configuration of the second insulator 62 in the second embodiment is line-symmetrical with the first insulator 261 about the axial center (vertical center) of the stator core 20. Therefore, the second insulator 62 in the second embodiment has the same reference numerals as in the first embodiment, and the description thereof is omitted.

Figure 23:
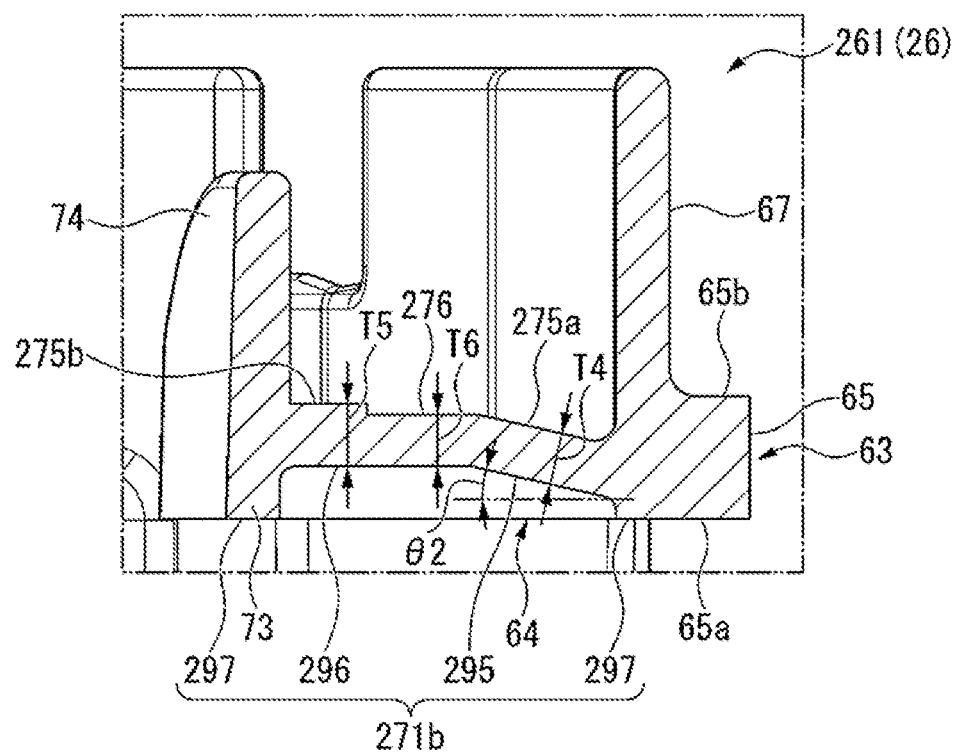
FIG. 23 is a cross-sectional view taken along the line XXIII-XXIII of FIG. 22.

As shown in FIGS. 22 and 23, the difference between the first embodiment described above and the second embodiment is that the shape of the tooth end surface covering part 71 in the first embodiment and the shape of the tooth end surface covering part 271 in the second embodiment are different.

More specifically, the front surface 271a of the tooth end surface covering part 271 of the second embodiment is provided with an inclined part 275a formed radially outward of a radial center 271c of the tooth end surface covering part 271 and a non-inclined part 275b formed radially inward of the radial center 271c of the tooth end surface covering part 271. The inclined part 275a is inclined such that the height from the axial end surface of the tooth body 28 gradually decreases radially outward. The non-inclined part 275 *b* is formed parallel to the axial end surface of the tooth body 28.

Further, a pin contact recess 276 is formed on the front surface 271*a* of the tooth end surface covering part 271. The pin contact recess 276 is a part with which an ejector pin of a resin molding machine (not shown) is in contact during resin molding of the first insulator 61.

A center 276*c* of the pin contact recess 276 is located slightly radially outward of a radial center 271*c* of the tooth end surface covering part 271. The diameter of the pin contact recess 276 is larger than the diameter of the pin contact recess 76 of the first embodiment.

Further, the back surface 271*b* of the tooth end surface covering part 271 on the side of the tooth body 28 is provided with an inclined part parallel part 295 formed to correspond to the shape of the inclined part 275*a*, a tooth parallel part 296 formed parallel to the axial end surface of the tooth body 28, and a contact part 297 that contacts the axial end surface of the tooth body 28. Therefore, the thickness T4 of the inclined part 275*a*, the thickness T5 of the non-inclined part 275*b*, and the thickness T6 of the pin contact recess 276 are all constant. Furthermore, the thickness of the entire tooth end surface covering part 71 is constant. In addition, the inclination angle θ2 of the inclined part 275*a* is smaller than 45°.

Therefore, according to the above-described second embodiment, the inclined part 275*a* has the same effect as the above-described first embodiment. In addition, since the thickness of the entire tooth end surface covering part 271 is constant, deterioration of moldability due to heat sink marks or the like may be suppressed when the insulators 261 and 62 are resin-molded. The resin molding accuracy of the insulators 261 and 62 may be improved.

The disclosure is not limited to the above-described embodiment, and includes various modifications to the above-described embodiment without departing from the spirit of the disclosure.

For example, in the above-described embodiment, the case where the motor 1 with a speed reducer is used, for example, as a drive source for a wiper device of a vehicle has been described. However, the disclosure is not limited thereto, and the motor 1 with a speed reducer may be applied as various drive devices. In addition, among the motors 1 with a speed reducer, only the electric motors 2 having the above configuration may be employed in various electric devices.

In the second embodiment described above, the case where the non-inclined part 275*b* is formed parallel to the axial end surface of the tooth body 28 has been described. However, the disclosure is not limited thereto, and the non-inclined part 275*b* may be formed to be inclined at an angle smaller than the inclination angle θ2 of the inclined part 275*a*.

In the above-described embodiments, the case where the inclined parts 75 and 275*a* are inclined such that the height from the axial end surface of the tooth body 28 gradually decreases radially outward has been described. However, the disclosure is not limited thereto, and the inclination direction of the inclined parts 75 and 275*a* may be changed according to the direction in which the teeth 22 protrude. That is, when the teeth 22 protrude radially outward, the base of the teeth 22 are located radially inward from the tips of the teeth 22. In such a case, the height of the inclined parts 75 and 275*a* from the axial end surface of the tooth body 28 may be inclined to gradually decrease radially inward.

In the above-described embodiments, the coil 24 of the stator 8 has a three-phase (U-phase, V-phase, W-phase) structure. However, the number of phases of the coil 24 is not limited to three.

What is claimed is:

1. An insulator, adapted to be attached to a core body having an annular shape and a plurality of teeth protruding along a radial direction from the core body, the insulator is adapted for insulating the teeth and a coil wound around the teeth, each tooth of the plurality of teeth being a tooth that protrudes radially inward from an inner surface of the core body and has an axial end surface facing toward an axial direction of the core body, the insulator comprising:
    a tooth end surface covering part configured to cover the axial end surface of the tooth,
    wherein the tooth end surface covering part comprises:
    a front surface configured to face away from the axial end surface of the tooth;
    a back surface opposite to the front surface, the back surface configured to face toward the axial end surface of the tooth;
    an inclined part configured on the front surface of the tooth end surface covering part and inclined such that a height of the inclined part gradually changes along the radial direction; and
    a concave part configured on the back surface of the tooth end surface covering part and being concaved toward the inclined part in a direction away from the axial end surface of the tooth,
    wherein the concave part comprises:
    an inclined part parallel part provided parallel to the inclined part; and
    a tooth parallel part provided parallel to a horizontal plane parallel to the axial end surface of the tooth.

2. The insulator according to claim 1, wherein
    the inclined part is inclined such that the height of the inclined part with respect to the horizontal plane, gradually decreases along the radial direction from a side close to an axial center of the core body toward a side away from the axial center of the core body.

3. The insulator according to claim 1, wherein the tooth parallel part is disposed closer to an axial center of the core body in the radial direction than the inclined part parallel part.

4. The insulator according to claim 1, comprising:
    a core end surface covering part covering an axial end surface of the core body;
    a core side surface covering part covering an inner peripheral surface of the core body;
    a tooth side surface covering part covering a circumferential side surface of a tooth body extending along the radial direction; and
    a collar side surface covering part covering an outer peripheral surface of a collar part integrally formed with a tooth tip part of the tooth body in the radial direction on a side close to an axial center of the core body and extends in a circumferential direction,
    wherein a skirt tip part of a skirt part formed by connecting the core side surface covering part, the tooth side surface covering part, and the collar side surface covering part on a side opposite to the core end surface covering part is obliquely formed such that its protruding height from the core end surface covering part changes gradually along the circumferential direction, and the skirt part comprises a flat part formed at a part of the skirt tip part where the protruding height is lowest and parallel to the core end surface covering part.

5. The insulator according to claim 1, comprising:
a core end surface covering part covering an axial end surface of the core body;
a core side surface covering part covering an inner peripheral surface of the core body;
a tooth side surface covering part covering a circumferential side surface of a tooth body extending along the radial direction of the tooth;
a collar side surface covering part covering an outer peripheral surface of a collar part, which is integrally formed with a tooth tip part of the tooth body in the radial direction on a side close to an axial center of the core body and extends in a circumferential direction;
a coil pull-out part formed in the core end surface covering part, collectively disposed at a base of one specific tooth among the plurality of teeth, and from which a terminal part of the coil is pulled out; and
a pair of press-fit protrusions formed near the tooth side surface covering part of the core side surface covering part for press-fitting the core side surface covering part into the core body,
wherein the pair of press-fit protrusions are disposed at equal intervals in the circumferential direction at positions corresponding to at least every other tooth in the circumferential direction of the plurality of teeth excluding the specific tooth.

6. The insulator according to claim 1, wherein the insulator comprises a resin-molded product and comprises a recess formed in the inclined part of the front surface, the recess being configured to be abutted by an ejector pin of a resin molding machine during resin molding of the insulator,
wherein a center of the recess is located radially inward from a radial center of the inclined part.

7. The insulator according to claim 6,
wherein a boundary line between the inclined part parallel part and the tooth parallel part is disposed along a part of an outer periphery of the recess part when viewed from an axial direction of the tooth.

8. A stator comprising:
the insulator according to claim 1;
the core body in an annular shape and configured to be attached with the insulator;
the teeth protruding inward from an inner peripheral surface of the core body along the radial direction; and
the coil wound around the teeth via the insulator while being routed along the core body, wherein the insulator comprises:
a tooth side surface covering part covering a circumferential side surface of a tooth body extending along the radial direction of the tooth;
an outer wall part protruding along an axial direction from a radially outer end of the inclined part; and
an inner wall part protruding along the axial direction from a radially inner end of the inclined part,
wherein the outer wall part comprises a pull-in slit formed for each of the teeth for pulling in the coil from a radially outer side to a radially inner side of the outer wall part,
a first side and a second side of the pull-in slit facing each other in a circumferential direction are disposed on two sides of a side surface covering part straight line passing through the tooth side surface covering part when viewed from the axial direction,
the second side is disposed closer to a circumferential center of the tooth than the first side is,
in a case where the coil is pulled into the pull-in slit by being routed to straddle a base of the corresponding tooth, a width between the side surface covering part straight line and the second side when viewed from the axial direction is larger than a wire diameter of the coil, and
in a case where the coil is pulled into the pull-in slit by being routed in an opposite direction to the corresponding teeth, a width between the side surface covering part straight line and the first side when viewed from the axial direction is smaller than the wire diameter of the coil.

9. The stator according to claim 8, wherein the tooth comprises:
the tooth body; and
a collar part integrally formed with a tooth tip part of the tooth body on a side opposite to the core body and extending in the circumferential direction;
wherein the outer wall part comprises a pull-out slit formed for each of the teeth for pulling out the coil from the radially inner side to the radially outer side of the outer wall part, and
the pull-out slit is disposed on a side opposite to the pull-in slit across a circumferential center of the corresponding tooth body, and in an area between a first straight line passing through the circumferential center of the tooth body and a radial center of the core body and a second straight line passing through a circumferential end of the collar part and the radial center of the core body.

10. An electric motor comprising:
the stator according to claim 8; and
a rotor rotatably disposed radially inward of the stator.

* * * * *